(12) United States Patent
Venkatraman et al.

(10) Patent No.: US 10,327,218 B2
(45) Date of Patent: *Jun. 18, 2019

(54) ROBUST DOWNLINK POSITIONING

(71) Applicant: QUALCOMM Incorporated, San Diego, CA (US)

(72) Inventors: Sai Pradeep Venkatraman, Santa Clara, CA (US); Ju-Yong Do, Cupertino, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,418

(22) Filed: Mar. 16, 2017

(65) Prior Publication Data

US 2018/0270783 A1    Sep. 20, 2018

(51) Int. Cl.
| | | |
|---|---|---|
| *G01S 5/02* | (2010.01) | |
| *G01S 5/10* | (2006.01) | |
| *G01S 5/12* | (2006.01) | |
| *G01S 5/14* | (2006.01) | |
| *H04W 64/00* | (2009.01) | |

(52) U.S. Cl.
CPC ......... *H04W 64/003* (2013.01); *G01S 5/0247* (2013.01); *G01S 5/0263* (2013.01); *G01S 5/10* (2013.01); *G01S 5/12* (2013.01); *G01S 5/14* (2013.01); *G01S 5/0236* (2013.01); *G01S 5/0252* (2013.01); *G01S 5/0284* (2013.01)

(58) Field of Classification Search
CPC ........................... H04W 64/003; G01S 5/0263
USPC ......... 455/456.1, 456.2, 456.3, 456.4, 456.5, 455/456.6, 457
See application file for complete search history.

(56) References Cited

U.S. PATENT DOCUMENTS 8,331,955 B2   12/2012  Bull et al.
9,188,659 B2   11/2015  Siomina et al.
(Continued)

OTHER PUBLICATIONS

ETSI: "ETSI TS 136 355 V12.4.0", Apr. 20, 2015 (Apr. 20, 2015), pp. 1-128, XP055343466, Retrieved from the Internet: URL: http://www.etsi.org/deliver/etsi_ts/136300_136399/136355/12.04.00_60/ts_136355v120400p.pdf [retrieved on Feb. 8, 2017].
(Continued)

*Primary Examiner* — Shahriar Behnamian
(74) *Attorney, Agent, or Firm* — Thien T. Nguyen

(57) ABSTRACT

Disclosed embodiments facilitate combining a plurality of wireless signal measurement sets with displacement measurements within some time interval of a position request to determine a User Equipment (UE) position. A first set of wireless signal measurements may be obtained from a first set of base stations at a first time at a first location. Subsequently, a second set of wireless signal measurements from a second set of base stations may be obtained at a second time at a second location distinct from the first location. A displacement measurement (e.g. a displacement vector) between the first location and the second location may be obtained. The position of the UE at the second location may then be determined based on the first and second sets of wireless signal measurements and the displacement measurement. In some embodiments, the first and second sets of wireless signal measurements may each be deficient measurement sets.

26 Claims, 8 Drawing Sheets

(56) References Cited

U.S. PATENT DOCUMENTS

| | | |
|---|---|---|
| 2012/0314604 A1 | 12/2012 | Siomina et al. |
| 2013/0307723 A1 | 11/2013 | Garin et al. |
| 2014/0057656 A1* | 2/2014 | Hasegawa ................. G01S 5/02 |
| | | 455/456.2 |
| 2014/0099970 A1* | 4/2014 | Siomina .................. G01S 19/49 |
| | | 455/456.1 |
| 2014/0354410 A1* | 12/2014 | Lin ....................... G01S 5/0284 |
| | | 340/10.1 |
| 2015/0094089 A1 | 4/2015 | Moeglein et al. |
| 2015/0350850 A1 | 12/2015 | Edge et al. |
| 2017/0031032 A1 | 2/2017 | Garin et al. |
| 2017/0293013 A1* | 10/2017 | Koenig ................. G01S 5/0252 |

OTHER PUBLICATIONS

International Search Report and Written Opinion—PCT/US2018/015700—ISA/EPO—dated May 2, 2018.

\* cited by examiner

| 505 | 510 | 515 | 520 | 525 | 530 | 535 | 540 |
|---|---|---|---|---|---|---|---|
| Time-stamp | BS ID* | BS location* | BS' ranges* | BS measure-ments | UE Location | Displacement Sensor measurements relative to $p_i(x, y)$ | Location Request |
| t | $BS_j$ | $BS_j^*(x_j, y_j)$ | $D_{BSj}^*$ | $W(BS_j)^*$ | $p_i(x, y)$ | $(d, COG)$ | Y/N |

FIG. 5

ROBUST DOWNLINK POSITIONING

FIELD

The subject matter disclosed herein relates generally to terrestrial positioning systems, and in particular, to systems and methods for position determination in challenging signal environments.

BACKGROUND

Downlink (DL) reference signals, which are transmitted from Base Stations (BS) to User Equipment (UE), may be used by UEs to determine a position of the UE. For example, in Observed Time Difference of Arrival (OTDOA) based DL positioning, the mobile station may measure time differences in received signals from a plurality of base stations (e.g. LTE enhanced Node Bs). When positions of the base stations are known, the observed time differences may be used to calculate the location of the UE using multilateration. The terms position and location are used synonymously herein.

In general, UEs may perform measurements of any DL signals to determine position. For example, UEs may perform measurements of Cell-specific Reference Signals (CRS) to determine position. However, DL signals may sometimes suffer from poor from hearability at the UE because of inter-cell interference. For example, when the Signal to Interference and Noise Ratio (SINR) is low, the UE may not detect a sufficient number of base stations thereby detrimentally affecting multilateration. To improve hearability, Positioning Reference Signals (PRS) may be used for location determination. PRS are pseudo-random sequences that avoid collision with CRS signals and overlap with control channels.

In Observed Time Difference of Arrival (OTDOA) based DL positioning, the UE may measure time differences in received signals from a plurality of base stations. When positions of the base stations are available, the observed time differences may be used to calculate the location of the UE. The measured time difference of arrival of the PRS from a reference cell, which can be the serving cell, and one or more neighboring cells is known as the Reference Signal Time Difference (RSTD). Using (i) the RSTD measurements, (ii) the absolute or relative transmission timing of each neighboring cell, and (iii) the known position(s) of BS physical transmitting antennas for the reference and neighboring cells, the UE's position may be determined using multilateration.

Reference Signals (RS) (e.g. PRS and/or CRS) may be used for DL positioning and UE position may be determined when TOA range measurements from 3 or more non-collocated (or geographically distributed) base stations are available at the same time. However, in some situations, one or more neighbor cell RS' may be unavailable (e.g. become too weak to detect) when the serving cell gets stronger. Thus, only one or two non-collocated BS measurements may be available thereby potentially creating a positioning coverage "hole" near base stations, which may make reliable or robust DL positioning challenging. As another example, a sufficient number of RS' may sometimes be unavailable in indoor environments.

Robust DL positioning methods may facilitate UE position determination in instances when position determination is detrimentally impacted by low availability of wireless signals for measurement.

SUMMARY

In some embodiments, a method on a user equipment (UE) may comprise: obtaining a first set of wireless signal measurements based on signals transmitted from a first set of base stations at a first time at a first location; obtaining a second set of wireless signal measurements based on signals transmitted from a second set of base stations at a second time subsequent to the first time at a second location distinct from the first location; obtaining a displacement measurement, the displacement measurement comprising a relative displacement between the first location and the second location; and determining a position of the UE at the second location based, in part, on the first set of wireless signal measurements obtained at the first location, the second set of wireless signal measurements obtained at the second location, and the displacement measurement.

In another aspect, a User Equipment (UE) may comprise: a displacement sensor and a processor coupled to the displacement sensor. In some embodiments, the processor may be configured to: obtain a first set of wireless signal measurements based on signals transmitted from a first set of base stations at a first time at a first location; obtain a second set of wireless signal measurements based on signals transmitted from a second set of base stations at a second time subsequent to the first time at a second location distinct from the first location; obtain a displacement measurement from the displacement sensor, the displacement measurement comprising a relative displacement between the first location and the second location; and determine a position of the UE at the second location based, in part, on the first set of wireless signal measurements obtained at the first location, the second set of wireless signal measurements obtained at the second location, and the displacement measurement.

In a further aspect, a User Equipment (UE) may comprise: means for obtaining a first set of wireless signal measurements based on signals transmitted from a first set of base stations at a first time at a first location; means for obtaining a second set of wireless signal measurements based on signals transmitted from a second set of base stations at a second time subsequent to the first time at a second location distinct from the first location; means for obtaining a displacement measurement, the displacement measurement comprising a relative displacement between the first location and the second location; and means for determining a position of the UE at the second location based, in part, on the first set of wireless signal measurements obtained at the first location, the second set of wireless signal measurements obtained at the second location, and the displacement measurement.

In another aspect, a non-transitory computer readable medium may comprise executable instructions that cause a processor to: obtain a first set of wireless signal measurements based on signals transmitted from a first set of base stations at a first time at a first location; obtain a second set of wireless signal measurements based on signals transmitted from a second set of base stations at a second time subsequent to the first time at a second location distinct from the first location; obtain a displacement measurement, the displacement measurement comprising a relative displacement between the first location and the second location; and determine a position of the UE at the second location based, in part, on the first set of wireless signal measurements obtained at the first location, the second set of wireless signal measurements obtained at the second location, and the displacement measurement.

The methods disclosed may be performed by a UE, including mobile stations, mobile devices, etc. using a combination of wireless signals (including signals from terrestrial wireless systems) and/or sensor based measurements (e.g. dead reckoning, vehicular dead reckoning, pedestrian dead reckoning, accelerometers, inertial measurement units (IMUs) etc). Embodiments disclosed also relate to software, firmware, and program instructions created, stored, accessed, read, or modified by processors using non transitory computer readable media or computer readable memory.

BRIEF DESCRIPTION OF THE DRAWINGS

FIG. 5 shows an exemplary measurement table indicating some of the information that may received and/or measured and/or determined and stored by UE 100.

DETAILED DESCRIPTION

Figure 1A:
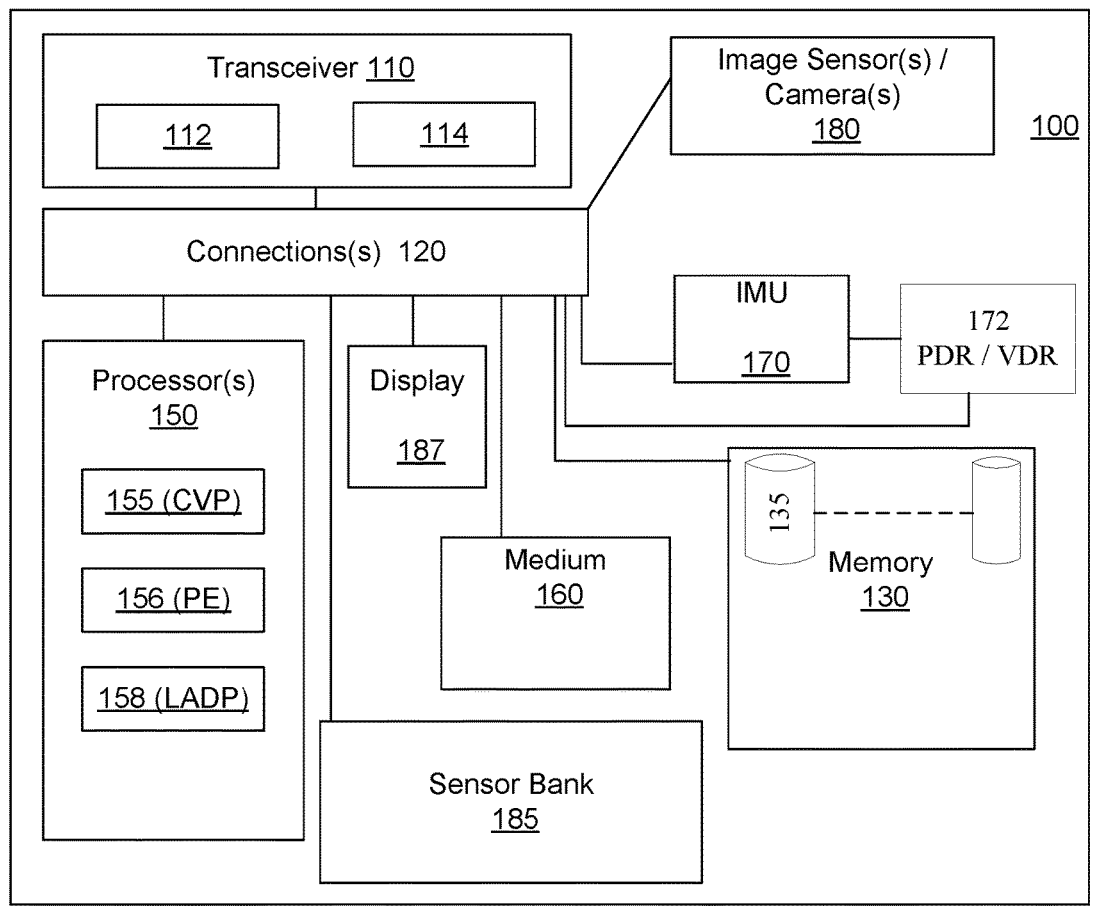
FIG. 1A shows a schematic block diagram illustrating certain exemplary features of a UE enabled to support mapping based on a combination of wireless signal measurements and sensor based measurements.

In some embodiments disclosed herein, measurements of wireless signal within some time interval may be combined with displacement sensor measurements to determine a location of a UE in instances when the number of available measurements from base stations at some point in time is inadequate for UE location determination based on the wireless measurements alone.

For example, wireless signal measurements from three or more non-collocated base stations at a given time are typically used to determine a 2-dimension (2D) location (e.g. latitude and longitude) of a UE. For a 3-dimensional (3D) location (e.g. latitude, longitude, and altitude), wireless signal measurements from four or more non-collocated base stations at a given time are typically used. Disclosed techniques facilitate location determination in signal environments where signals from less than a desired number of non-collocated base stations are available.

A measurement set may be obtained by a UE at a first time and at some (unknown) location from one or more base stations. The term "deficient measurement set" or "deficient measurement epoch" refers to wireless measurements obtained by a UE at a location and point in time from a set of base stations, where the wireless measurements are insufficient to determine a position of the UE with the requested dimensionality (e.g. 2D or 3D) specified in the position request. The "deficiency" thus relates to UE position determination—specifically to insufficient information for UE position determination. A deficient measurement set may result from one or more of the situations below: (a) the number of distinct base stations observed by the UE is insufficient to determine position with the requested dimensionality; (b) the base stations are not geographically well dispersed; (c) "near-far" problems, where neighbor cells may be too weak to detect as the serving cell gets stronger (e.g. when the UE is near the serving base station but relatively far from neighbor base stations); and/or (d) relatively high Horizontal Dilution of Precision (HDOP). One or more of the situations outlined above may lead to a deficient measurement set, thereby limiting UE position determination.

As a consequence of a deficient measurement set, the UE may be unable to determine its position based on the wireless signal measurements and received location assistance data. For example, if 3D position determination is desired, and a measurement set includes wireless signal measurements from less than four non-collocated base stations, then the measurement set may be termed a deficient measurement set. As another example, a measurement set may be considered a deficient measurement set, if 2D position determination is desired, and the measurement set includes wireless signal measurements from less than three non-collocated base stations. Thus, when a UE obtains a deficient measurement set, UE position determination in the desired number of dimensions (e.g. a dimensionality specified in the position request) may be constrained.

Disclosed techniques facilitate location determination by combining measurements from a plurality of measurement sets (e.g. deficient measurement sets) with displacement sensor measurements. In some embodiments, the measurement sets (which can be deficient measurement sets) may be obtained autonomously by a UE at specific intervals. For example, the measurement sets may be obtained autonomously by the UE even in the absence of a position determination request.

In some embodiments, the wireless signal measurements (e.g. RS measurements) and displacement sensor measurements may be obtained continuously, periodically, intermittently, or at specified/predetermined time intervals. The wireless measurements and the displacement sensor measurements may be timestamped and stored as one or more measurement sets. When a position request is received, available wireless measurements may be combined with the stored wireless signal measurements based on displacement sensor measurements to obtain a current position of a UE. In some embodiments, the stored wireless measurements and the displacement sensor measurement may have been obtained within some time interval of the position request. Thus, a position of the UE may be determined based on batched wireless measurements (e.g. from a plurality of deficient measurement sets) and displacement measurements.

Disclosed embodiments facilitate location determination even when individual wireless signal measurements taken during the time interval are insufficient to determine a location of the UE with the desired dimensionality. Disclosed embodiments facilitate combining a plurality of deficient wireless measurement sets obtained within some time interval of a position request. The combination of measurements may be effected using displacement sensor measurements, and the combined measurements may be used to determine a position of a UE. The displacement sensor measurements may be viewed, for example, as facilitating the combining or batching of a plurality of deficient measurement sets within some time interval of a position request to determine a location of a UE at the time the position request is received.

For example, 2D position determination may be facilitated even in instances when less than three base stations are available for measurement at a time the position request is received. Similarly, disclosed embodiments facilitate 3D position determination even when less than four base stations are available for measurement at a time the position request is received.

In some embodiments, if: (i) a measurement set at the time of a position request is deficient; and (ii) and the sum of the number of distinct non-collocated base stations in each deficient measurement set during a time interval of position request exceeds the dimensionality of the position location request, then, displacement sensor measurements may be used to determine a location of the UE in the specified or desired dimensionality. For example, the measurements obtained in a plurality of the deficient measurements sets may be combined or correlated using displacement sensor measurements and used to obtain a location of the UE at the time position request.

In some embodiments, the measured wireless signals may be reference signals (e.g. PRS/CRS) transmitted by base stations. The displacement sensor measurements may include Pedestrian Dead Reckoning (PDR) or Vehicular Dead Reckoning (VDR). PDR may use movement sensors, such as Micro Electro-Mechanical Sensors (MEMS), accelerometers and/or Inertial Measurement Units (IMUs) and/or other types of displacement sensors, which may be mounted on and/or coupled to the UE. For example, IMU's may be housed in a UE, or worn by a user and coupled to a UE via a Wireless Personal Area Network (WPAN).

VDRs may use IMUs, which, in some instances, may be part of a Vehicular Navigation System (VNS). In some embodiments, such as with ADAS (Advanced Driver Assistance Systems) applications, VDR may use or be based on one or more continuous, reliable, accurate sources of relative positioning. For example, Light Detection and Ranging (LIDAR) measurements and/or Radio Detection and Ranging (Radar) measurements may be used to obtain relative displacement estimates. LIDAR refers to remote sensing technology that measures distance by illuminating a target (e.g. with a laser or other light) and analyzing the reflected light. The term "relative positioning" or "relative displacement" is used herein to refer to a baseline vector between two positions occupied by a single UE.

The term "displacement sensor" is used herein to refer to any sensor based technique for measuring displacement. The "displacement sensor" may be a combination of one or more of the following sensors including IMUs, accelerometers including 3-axis accelerometers, Pedestrian Dead Reckoning (PDR), Vehicular Dead Reckoning (VDR), RADAR, LIDAR, Visual Inertial Odometry (VIO) determined pose and displacement using image sensors based on captured images, etc. The term "displacement sensor" is also used to refer to one or more the above sensors in combination with sensors such as a magnetometer or compass, which may provide a direction or heading during UE movement; and/or an altimeter or barometer, which may provide indications of altitude (e.g. above sea level) or changes in altitude. The term "displacement measurements" may refer to measurements from any of the above sensors that are used to determine displacement. VIO refers to the process of determining the position and orientation (or pose) and/or displacement of a UE by analyzing and comparing features in camera images captured at various points in time during UE movement. Displacement measurements by a displacement sensor may provide, or be used to determine: (a) a displacement (or baseline distance) between two locations occupied by a UE at different points in time and (b) a "direction" indicating a direction of the displacement between the two locations relative to a specified frame of reference.

An estimate of a location of a UE may be referred to as a location, a location estimate, a location fix, a fix, a position, position estimate or position fix, and may be geographic, thus providing location coordinates for the mobile device (e.g., latitude and longitude) which may or may not include an altitude component (e.g., height above sea level, height above or depth below ground level, floor level or basement level). A location of a mobile device may also be expressed as an area or volume (defined either geographically or in civic form) within which the mobile device is expected to be located with some probability or confidence level (e.g., 67% or 95%). In the description contained herein, the use of the term location may comprise any of these variants unless indicated otherwise. The terms "location determination" or "position determination" are used to refer to the process of determining a location such as obtaining coordinates (e.g. latitude, longitude, altitude etc.). Thus, the term "location" (also referred to as a "position") as used herein may refer to a geodetic location that may comprise coordinates (e.g. latitude, longitude and possibly altitude) and optionally an expected error or uncertainty for the location. A geodetic location may be absolute (e.g. comprise a latitude and longitude) or may be relative to some other known absolute location. A location may also be civic or geographic and comprise a place name, street address or other verbal description or definition.

Conventionally, when location determination uses wireless measurements exclusively (i.e. without additional sensor measurements), typically, wireless signal measurements from at least S+1 non-collocated base stations are used to determine a S-dimensional location of a UE, where $1 \leq S \leq 3$. In some embodiments disclosed herein, an S-dimensional location of a UE may be determined by combining two or more wireless signal measurement sets (which may be deficient measurement sets), where each wireless signal measurement set may comprise measurements from less than S+1 base stations. The measurements may be combined based, in part, on displacement sensor measurements, which may provide a displacement and a direction relative to some (unknown) prior position of the UE at which one of the deficient measurement sets may have been obtained.

The terms "User Device" (UD) or "user equipment" (UE) are used interchangeably herein and may refer to a device such as a cellular or other wireless communication device, a Secure User Plane Location (SUPL) Enabled Terminal (SET), a mobile station (MS), personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND. The UE may represent a mobile telephone, notepad computer, or laptop, or it may be a device coupled to a vehicle and/or VNS that collects wireless and sensor (e.g. IMU, RADAR, and/or LIDAR based) measurement sets, which may be used to provide a real time position in accordance with disclosed embodiments.

FIG. 1A shows a schematic block diagram illustrating certain exemplary features of UE 100 enabled to support location determination based on a combination of wireless signal measurements and sensor based measurements. For example, the sensor based measurements may be used to compute relative displacement and a direction between two positions where wireless measurements may have been obtained. In some embodiments, UE 100 may also support hybrid position determination by combining sensor based techniques with wireless signal measurements. The term "hybrid" is used to refer to the use of a combination of one or more of sensor/displacement sensor based techniques with wireless signal based techniques to perform location determination in a manner consistent with embodiments disclosed herein.

UE 100 may, for example, include one or more processors or processor(s) 150, memory 130, a transceiver 110 (e.g., wireless network interface), and image sensors/camera(s) 180. In some embodiments, UE 100 may also optionally or additionally include one or more of: a magnetometer, an altimeter, a barometer, and sensor bank 185 (collectively referred to as sensors 185). In some embodiments, UE 100 may include Inertial Measurement Unit (IMU) 170. In some embodiments, IMU 170 may be coupled to (or form part of) Pedestrian Dead Reckoning (PDR) or Vehicular Dead Reckoning (VDR) 172. In some embodiments, PDR/VDR 172 may be implemented based on inputs from IMU 170 and using some combination of hardware (e.g. an ASIC, processor, and/or other circuitry), firmware, or software (e.g. code to process inputs from IMU 170). Further, in some embodiments, VDR in PDR/VDR 172 may include or be coupled to RADAR or LIDAR components, which may form part of a VDR system.

In some embodiments, UE 100 may further include non-transitory computer-readable medium 160, display 187, and memory 130, which may be operatively coupled to each other with one or more connections 120 (e.g., buses, lines, fibers, links, etc.). In certain example implementations, all or part of UE 100 may take the form of a chipset, and/or the like. Connections 120 may couple the various blocks shown in FIG. 1A.

Transceiver 110 may, for example, include a transmitter 112 enabled to transmit one or more signals over one or more types of wireless communication networks and a receiver 114 to receive one or more signals transmitted over one or more types of wireless communication networks. Wireless communication networks may include, for example, Wireless Wide Area Networks (WWAN), including cellular networks, and/or Wireless Local Area Networks (WLANs). In some embodiments, receiver 114 may measure wireless signals. For example, receiver 114 may measure DL reference signals, including PRS and/or CRS signals transmitted from one or more base stations. Further, in some embodiments, transceiver 110 may perform Round Trip Time (RTT) measurements, Time of Arrival (TOA) measurements RSTD, and/or Observed Time Difference of Arrival (OTDOA) measurements. In some embodiments, the measurements by transceiver 114 may be performed in conjunction with processor(s) 150. In some embodiments, measurements of signals measured by receiver 114 may be sent to processor(s) 150. In some embodiments, transceiver 110 may also form part of RADAR circuitry.

In some embodiments, UE 100 may also include Inertial Measurement Unit (IMU) 170. In some embodiments, IMU 170, which may comprise 3-axis accelerometer(s), 3-axis gyroscope(s), and/or magnetometer(s), may provide velocity, displacement, orientation, and/or other position related information to processor(s) 150. In some embodiments, IMU 170 may be configured to measure and output measured information, which may be timestamped and associated with a set of wireless measurements. For example, IMU measurements and wireless measurements (e.g. PRS/CRS measurements) obtained at the same time, or within a short time window, may be associated with each other. In some embodiments, the wireless and IMU measurements may be stored as a measurement set.

In some embodiments, IMU 170, which may comprise a tri-axial accelerometer, and/or a pedometer, may be coupled to PDR/VDR 172. The PDR component in PDR/VDR 172 may process the inputs received from IMU 170 and obtain information about a pedestrian/UE direction of movement and a UE rotation vector. In some embodiments, the information may be obtained at each "step" event (e.g. when a pedestrian takes a step while walking/running) and may include one or more of: a course-over-ground (COG) angle, COG reliability metric (e.g. expressed as a standard deviation of angular error in degrees), an alignment change indicator, a turn indicator, and/or an orientation change since last alignment change. COG angle refers to a dominant direction of movement of the pedestrian/vehicle/UE.

Figure 1B:
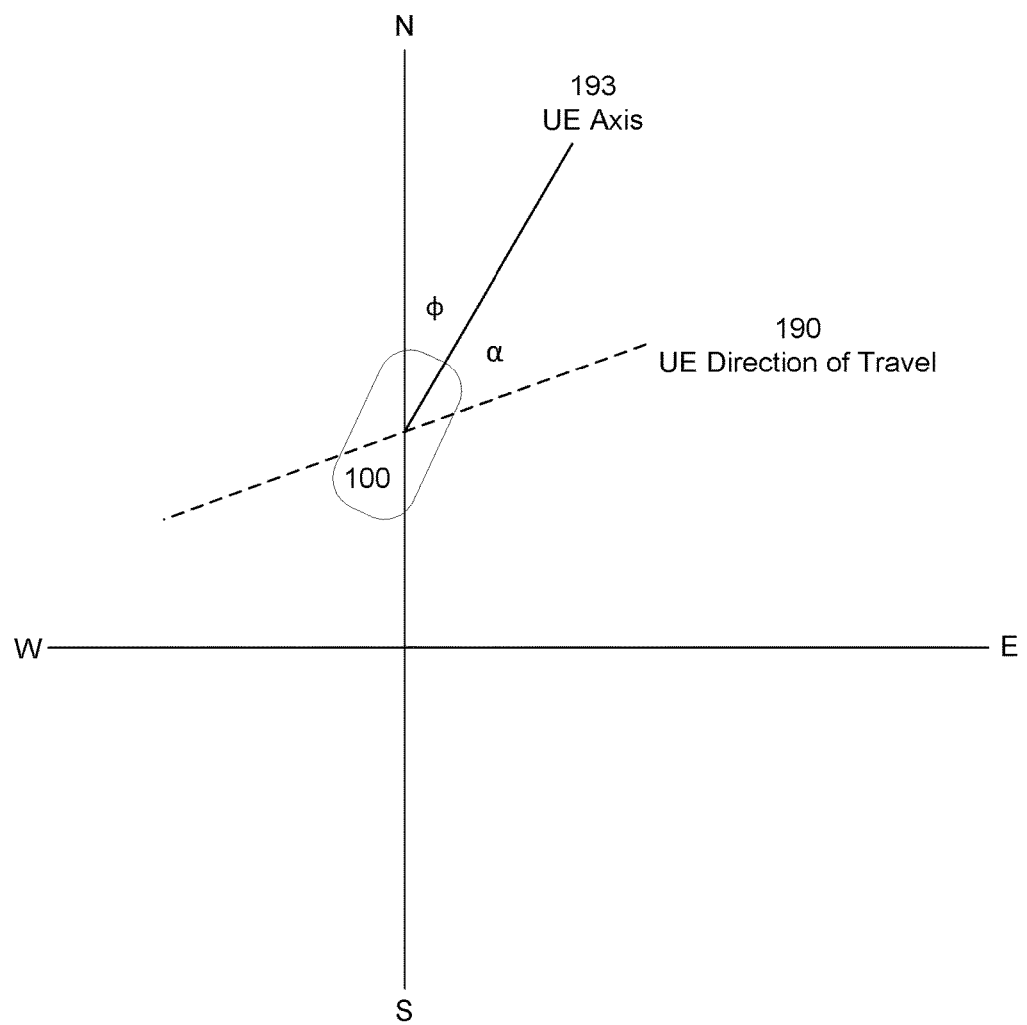
FIG. 1B illustrates the Course over Ground (COG) for a UE.

FIG. 1B illustrates the COG for UE 100. The COG may be expressed as COG=$\phi$+$\alpha$, where $\phi$ is the device orientation angle relative to a cardinal direction (e.g. "N" north) and $\alpha$ is the pedestrian alignment angle, which represents the angle between the UE axis 193 and a direction of travel 190. In some embodiments, the pedestrian alignment angle may be defined in the horizontal plane because pedestrian motion is typically horizontal. Device axis 193 may be obtained from a horizontal projection of the dominant device axis. For example, for a pedestrian, a COG angle may be obtained by assuming that forward/backward acceleration is dominant relative to lateral acceleration. Walking and/or running may be identified, for example, by detecting a "walk signature" based on measurements by IMU 170. Based on the measurements, a pedometer may determine a baseline displacement of UE 100 over some time period. In some embodiments, measurements by the PDR, including COG measurements, may be used to obtain a relative displacement and a direction (e.g. relative to a frame of reference or a cardinal direction) between two points.

In some embodiments, a transformation may be used to transform measurements in a local/device/UE coordinate system to an absolute coordinate system (e.g. earth centric coordinate system). The direction of travel may be estimated based on techniques such as Principal Component Analysis (PCA). The approach above may also be generalized to three-dimensions (3D) by generalizing the angles to 3D rotations and by replacing the axes or directions by 3D vectors. In some embodiments, a magnetometer or compass on UE 100 may be used to obtain cardinal directions based on measurements of the earth's magnetic field.

Referring to FIG. 1A, in embodiments where displacement is measured using other sensors (e.g. RADAR or LIDAR or VIO), measurements from the displacement sensors may be timestamped and associated with wireless measurements obtained at the same time, or within a short time window of the wireless measurements. In some embodiments, the wireless and displacement sensor measurements may be stored as a measurement set. In some embodiments, the output of displacement sensors (e.g. IMU 170 or PDR/VDR 172) may be used, in part, by processor(s) 150 to determine a position and orientation of UE 100. For example, displacement sensor measurements and wireless measurements may be timestamped and the measurements may be associated with each other based on the time stamps. The association of one or more measurements may occur concurrently with measurement recordation, and/or at a later point in time based on the timestamps associated with the measurements.

The term "measurement set" is used to refer to signal measurements performed by a UE at a measurement location at a point in time or within some specified interval of a point in time. The signal measurements made may be related to position determination. The signal measurements made may also depend on UE 100, the capabilities of UE 100, environmental characteristics and/or signal characteristics that are available for measurement by UE 100 at a specific location/time. As one example, a measurement set may comprise available wireless (e.g. WWAN) measurements, displacement sensor measurements (e.g. measurements by one or more of IMU 170, PDR/VDR 172, or VIO measurements, RADAR/LIDAR measurements), where each element of the measurement set may have been recorded within some specified time interval of a point in time. The measurement sets recorded by UE 100 may be timestamped and stored in memory 130 on UE 100.

In some embodiments, parameters derived from the measurements in the measurement set and information received as part of location assistance data may also be stored by UE 100 in memory 130. For example, the locations of base stations (which may be received as part of location assistance information) and/or the distances of one or more base stations (e.g. determined by UE from wireless measurements) relative to a current location of UE 100 may be stored may be stored as part of a measurement set.

In some embodiments, camera(s) 180 may include multiple cameras, front and/or rear facing cameras, wide-angle cameras, and may also incorporate image and optical sensors (e.g. CCD sensors, CMOS sensors.etc). Camera(s) 180, which may be still and/or video cameras, may capture a series of 2-Dimensional (2D) still and/or video image frames of an environment and send the captured image frames to processor(s) 150. For example, camera 180 may capture a series of 3-dimensional (3D) images from a Time-of-Flight camera, or associated pairs or multiple 2-dimensional (2D) frames captured by stereo, trifocal, or multifocal cameras. In some embodiments, camera(s) 180 may be a wearable camera, or an external camera, which may be operationally coupled to, but housed separately from, other functional units in UE 100. In one embodiment, images captured by camera(s) 180 may be in a raw uncompressed format and may be compressed prior to being processed and/or stored in memory 160. In some embodiments, image compression may be performed by processor(s) 150 (e.g. by CVP 155) using lossless or lossy compression techniques. In some embodiments, camera 180 may be a depth sensing camera or may be coupled to depth sensors. The term "depth sensor" is used to refer to functional units that may be used to obtain depth information for an environment independently and/or in conjunction with camera(s) 180.

In some embodiments, camera(s) 180 and/or other sensors may form part of, or may be coupled to LIDAR circuitry on UE 100, which may provide measurements to estimate relative displacement of UE 100 between two locations. In some embodiments, displacement between two locations may be estimated by using images captured by cameras using VIO techniques based on captured images. As outlined above, captured images may be timestamped and associated with one or more wireless measurements and form part of a measurement set.

Processor(s) 150 may be implemented using a combination of hardware, firmware, and software. In some embodiments, processor may determine displacement based on displacement sensor measurements, including PDR and/or VDR measurements.

In some embodiments, processor(s) 150 may include Computer Vision Processor (CVP) 155, which may implement a variety of positioning functions, including UE location determination, UE displacement determination, image processing, VIO, and Computer Vision (CV) functions. In some embodiments, CVP 155 may comprise a VIO engine to perform visual inertial odometry. For example, processor(s) 150 may execute software to process image frames captured by camera(s) 180 to determine the pose of camera(s) 180 and/or UE 100 using VIO. The poses of camera(s) 180 and/or UE 100 at two locations may be used to compute a baseline displacement between the two locations and an angle or direction of travel. The pose of a camera refers to the position and orientation of the camera relative to a frame of reference. In some embodiments, camera pose may be determined for 6-Degrees Of Freedom (6-DOF), which refers to three translation components (which may be given by X,Y,Z coordinates of a frame of reference) and three angular components (e.g. roll, pitch and yaw relative to the same frame of reference).

Further, in some embodiments, processor(s) 150 may further comprise a Positioning Engine (PE) 156 (hereinafter PE 156), which may use information derived from displacement sensor measurements and wireless measurements either independently, or in conjunction with received location assistance data to determine a position and/or a position uncertainty estimate for UE 100. PE 156 may be implemented using software, firmware, and/or dedicated circuitry, such as Application Specific Integrated Circuits (ASICs), Digital Signal Processors (DSPs), and/or dedicated processor (such as processor(s) 150).

Further, in some embodiments, processor(s) 150 may comprise Location Assistance Data Processor (LADP) 158 (hereinafter LADP 158), which may process location assistance information. In some embodiments, processor(s) 150/ LADP 158 may also be capable of processing various other assistance information such as Long Term Evolution (LTE) Positioning Protocol (LPP) or LPP extensions (LPPe) messages including assistance information either directly or in conjunction with one or more other functional blocks shown in FIG. 1A. In some embodiments, PE 156 and/or LADP 158 may be used to obtain an initial absolute location of UE 100. In some embodiments, processor(s) 150 and/or CVP 155 and/or PE 156 and/or LADP 158, may be implemented using dedicated circuitry, such as Application Specific Integrated Circuits (ASICs), Digital Signal Processors (DSPs), Field Programmable Gate Arrays (FPGAs), and/or dedicated processor.

In some embodiments, UE 100 may include one or more UE antennas (not shown) which may be internal or external. UE antennas may be used to transmit and/or receive signals processed by transceiver 110. In some embodiments, UE antennas may be coupled to transceiver 110. In some embodiments, measurements of signals received (transmitted) by UE 100 may be performed at the point of connection of the UE antennas and transceiver 110. For example, the measurement point of reference for received (transmitted) RF signal measurements may be an input (output) terminal of the receiver 114 (transmitter 112) and an output (input)

terminal of the UE antennas. In an UE 100 with multiple UE antennas or antenna arrays, the antenna connector may be viewed as a virtual point representing the aggregate output (input) of multiple UE antennas. In some embodiments, UE 100 may measure received signals including signal strength and TOA measurements and the raw measurements may be stored, associated with displacement sensor measurements and the measurement set may be processed by processor(s) 150. In some embodiments, transceiver 110 may include and/or be coupled to a RADAR unit, which may be used to obtain non-GNSS displacement measurements.

The methodologies described herein may be implemented by various means depending upon the application. For example, these methodologies may be implemented using modules in hardware, firmware, software, or any combination thereof. For a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using code, procedures, functions, and so on that perform the functions described herein. Any machine-readable medium tangibly embodying instructions may be used in implementing the methodologies described herein. For example, software codes may be stored in a non-transitory computer-readable medium 160 or memory 130 that is connected to and executed by processor(s) 150. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates hybrid wireless-displacement sensor based location determination, image processing, and other tasks performed by CVP 155, PE 156, and/or LADP 158, on processor(s) 150. For example, memory 160 may hold data, wireless measurements, displacement sensor measurements (e.g. data provided by IMU 170, a pedometer, PDR/VDR 172, camera(s) 180, and/or sensors 185), captured still images, depth information, video frames, program results etc.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support hybrid wireless-displacement sensor based position determination Computer-readable media 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Memory 130 may represent any data storage mechanism. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise collocated/coupled with processor(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions 1108 stored thereon, which if executed by at least one processor(s) 150 may be operatively enabled to perform all or portions of the example operations as described herein. Computer readable medium 160 may be a part of memory 130.

Further, UE 100 may include a screen or display 187 capable of rendering color images, including 3D images. In some embodiments, display 187 may be used to display live images captured by camera(s) 180, Graphical User Interfaces (GUIs), program output, etc. In some embodiments, display 187 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 187 may be implemented using a Liquid Crystal Display (LCD) display or a Light Emitting Diode (LED) display, such as an Organic LED (OLED) display. In other embodiments, for example as shown in FIG. 1B, display 187 may be housed separately and may be operationally coupled to camera 180, processor(s) 150, and/or other functional units in UE 100.

In some embodiments, processor(s) 150 may also receive input from one or more sensors in sensor bank 185 (also referred to as "sensors 185"), which may include, for example, a magnetometer, altimeter and/or barometer. The magnetometer may be capable of measuring the intensity and/or the direction of the Earth's magnetic field and may serve as a compass and/or provide an indication of a direction of travel of UE 100. The altimeter may be used to provide an indication of altitude above a calibrated level, while the barometer may provide an indication of atmospheric pressure, which may also be used to obtain a determination of altitude. One or more of the above measurements may also be used to determine a baseline displacement of UE 100 between two points in time. As used herein, the term "displacement sensor" also refers to one or more of sensors in sensor bank 185 when used, at least in part, to determine baseline displacement between two points. For example, in some embodiments, when a 2D location of UE is determined using methods disclosed herein, a 3D location of UE 100 may be obtained based on inputs from an altimeter and/or barometer.

In some embodiments, sensor bank 185 may include one or more of an ambient light sensor, acoustic transducers such as microphones/speakers, ultrasonic transducers, and/or depth sensors, which may be used to acquire depth information and/or determine distance to a target. In general, the list of sensors above in not exhaustive and sensor bank 185 may include various other types of sensors and transducers which are increasingly being incorporated into user devices such as vehicle mounted devices, smartphones, and other mobile devices. In some embodiments, UE 100 may not include one or more sensors in sensor bank 185. For example, one or more of an altimeter, barometer, and/or magnetometer may be omitted.

Figure 2A:
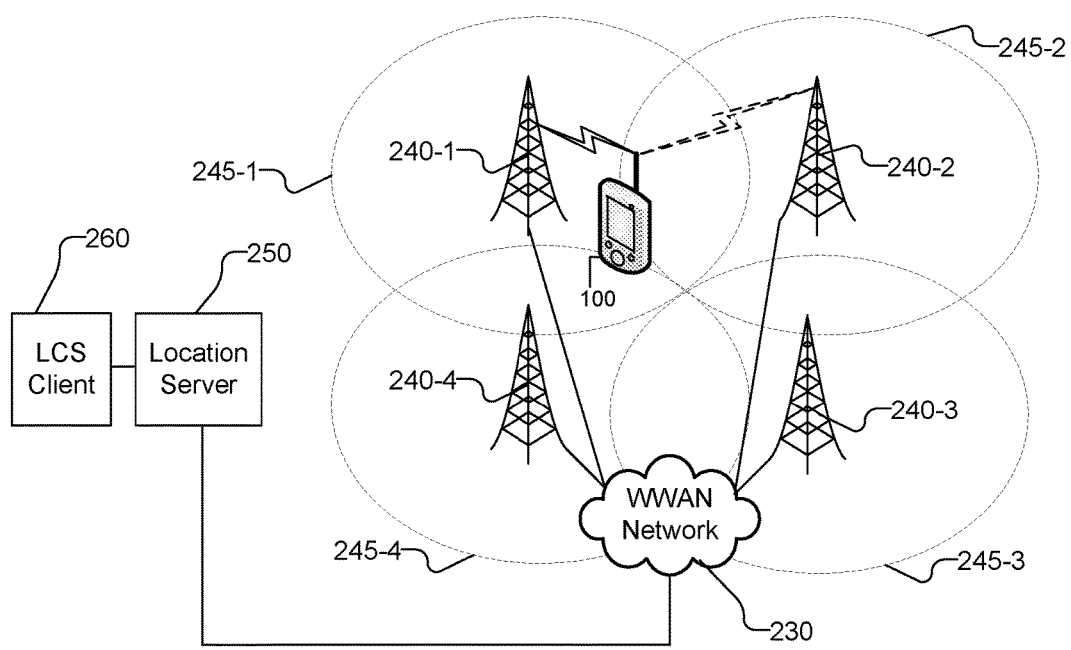
FIG. 2A shows an architecture of a system capable of providing Location, and/or Navigation services to UEs.

FIG. 2A shows an architecture of a system 200 capable of providing Location, and/or Navigation services to UEs 100. In some instances, system 200 may be used for location services, including for hybrid wireless-displacement sensor based location determination according to some disclosed embodiments. System 200 shows UE 100 wirelessly coupled to a Radio Access Network (RAN) served by base stations 240. UE 100 and base stations 240 may also be in communication with location server (LS) 250 over WWAN network 230.

In FIG. 2A, one or more of the blocks shown may correspond to logical entities. The logical entities shown in FIG. 2A may be physically separate, or, one or more of the logical entities may be included in a single physical server or device. The logical entities and block shown in FIG. 2A are merely exemplary and the functions associated with the logical entities/blocks may be split or combined in various ways in a manner consistent with disclosed embodiments.

As illustrated in FIG. 2A, the UE 100 may communicate with LS 250 through network 230 and one of base station 240-1-240-4, collectively referred to as base stations 240, which may be associated with Wireless Wide Area Network (WWAN) 230. LS 250 may, in some instances, provide location assistance data and/or assist in determination of a position of UE 100 based on wireless measurements obtained by UE 100. The transfer of the location assistance and other information may occur at a rate appropriate to both UE 100 and LS 250.

System 200 may support the transfer of location assistance data or location information, using messages such as Long Term Evolution (LTE) Positioning Protocol (LPP) or LPP extensions (LPPe) messages between UE 100 and LS 250 or another network entity. Further, the LPP A protocol (LPPa) may be used for communication between LS 250 and one or more base stations 240 (e.g. evolved Node B's).

LPP is well-known and described in various publicly available technical specifications from 3GPP (e.g. 3GPP Technical Specification (TS) 36.355). LPPe has been defined by the Open Mobile Alliance (OMA) (e.g. in OMA TS OMA-TS-LPPe-V1_0) and may be used in combination with LPP such that an LPP message may contain an embedded LPPe message in a combined LPP/LPPe message. LPPa is described in the publicly available 3GPP TS 36.455 document. In general, a positioning protocol such as LPP and LPPe may be used to coordinate and control position determination. The positioning protocol may define: (a) positioning related procedures that may be executed by LS 250 and/or UE 100; and/or (b) communication or signaling related to positioning between LS 250 and UE 100. In the case of LPPa, the protocol may be used between an LS 250 and base stations 240 to enable LS 250 to request and receive configuration information for the base stations 240 (e.g. details of RS/PRS signals transmitted by the BS).

Base Stations 240 may form part of a wireless communication network, which may be a wireless wide area network (WWAN), wireless local area network (WLAN), etc. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from an organization known as the "3rd Generation Partnership Project" (3GPP). Cdma2000 is described in documents from a consortium named "3rd Generation Partnership Project 2" (3GPP2). 3GPP and 3GPP2 documents are publicly available. In some embodiments, system 200 may form part of, comprise or contain an Evolved Packet System (EPS), which may comprise an evolved UMTS Terrestrial Radio Access Network (E-UTRAN) and an Evolved Packet Core (EPC). In some embodiments, system 200 may form part of, comprise or contain a GSM/EDGE Radio Access Network (GERAN), a 1×RTT network, an Evolution-Data Optimized (EvDO) network, a WiMax network. In some embodiments, system 200 may also include or contain a Wireless Local Area Network (WLAN). A WLAN may be an IEEE 802.11x network. The techniques disclosed may be implemented in conjunction with any combination of WWAN, WLAN, etc.

For simplicity, only one UE 100 and LS 250 are shown in FIG. 2A. In general, system 200 may comprise multiple cells indicated by 245-k ($0 \leq k \leq N_{cells}$, where $N_{cells}$ is the number of cells) with additional networks 230, LCS clients 260, UEs 100, LS' 250, base stations (or BS antennas) 240. System 200 may further comprise a mix of cells including microcells and femtocells in a manner consistent with embodiments disclosed herein.

System 200 may be used to facilitate position determination. For example, in Control Plane (CP) positioning, the signaling used to initiate a positioning event and the signaling related to the positioning event may occur over the control channels of the cellular network. In CP positioning, LS 250 may include or take the form of an Enhanced Serving Mobile Location Center (E-SMLC). As another example, in User Plane (UP) positioning such as Secure User Plane Location (SUPL) positioning, signaling to initiate and perform Location Based Services (LBS) functions may utilize user data channels and appear as user data. In UP positioning, LS 250 may include or take the form of a SUPL Location Platform (SLP).

UE 100 may be capable of wirelessly communicating with LS 250 through WWAN network 230 that supports positioning and location services to determine a location of UE 100. In one implementation, the network between location server 250 and UE 100 may include one or more serving gateways or Packet Data Network gateways. In addition, one or more location servers may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in the network.

LS 250 may be capable of providing positioning assistance data to UE 100 including, for example, information regarding signals to be measured (e.g., signal timing, PRS configuration, PRS muting patterns, expected TOAs of RS'), locations and identities of terrestrial transmitters to facilitate positioning techniques (e.g. such as AFLT, OTDOA). For example, LS 250 may include an almanac which indicates locations and identities of base stations 240, cellular transceivers and/or local transceivers, in a particular region or regions such as a particular venue, and may provide information descriptive of signals transmitted by base stations (or BS antennas) 240 such as transmission power, signal timing etc. In some embodiments, the absolute or relative transmission timing of each cell, and the known position(s) of base stations may be sent to UE 100 as location assistance data by LS 250.

Positioning may be UE-based or UE-assisted. In UE-based positioning, the UE may determine its position based on measurements of wireless signals from base stations (e.g. UE Observed Time Difference Of Arrival (OTDOA) measurements of reference signals from base stations). OTDOA is a downlink (DL) positioning method defined in the relevant 3GPP standards (e.g. 3GPP TS 23.271 entitled "Functional Stage 2 Description of Location Services (LCS)," 3GPP TS 36.305 entitled "Stage 2 Functional Specification of User Equipment (UE) Positioning in E-UTRAN," and 3GPP TS 36.355 entitled "LTE Positioning Protocol (LPP)").

OTDOA uses multilateration in which the UE measures the time of arrival (TOA) of signals received from multiple base stations (e.g. "evolved NodeBs" also referred to as "eNodeBs" or "eNBs"). The TOAs from several neighboring base stations (e.g. neighboring eNBs) are subtracted from the TOA of a reference base station (e.g. reference eNB) to obtain the OTDOA measurements. Geometrically, each TOA determines a hyperbola, and the point at which the hyperbolas intersect is the position of the UE.

For a 2D UE location (e.g. latitude and longitude), at least three timing measurements from geographically dispersed eNBs with good geometry may be used. Location accuracy and performance may be improved via incorporation of additional eNBs. For example, where the UE measures three TOAs $\tau_1$, $\tau_2$ and $\tau_3$ for $eNB_1$, $eNB_2$, and $eNB_3$, respectively, relative to a time reference, and if $eNB_1$ is selected as the reference cell, then, the OTDOAs may be formed as $t_{(2,1)}=(\tau_2-\tau_1)$, and as $t_{(3,1)}=(\tau_3-\tau_1)$. Because TOA measurements may have an associated accuracy and uncertainty, the determined UE position may also exhibit an associated accuracy and uncertainty.

For OTDOA positioning, Reference Signal Time Difference (RSTD) measurements may be used. The RSTD is the relative timing difference between two cells—a reference cell and the measured neighboring cell. RSTD measurements may be intra-frequency cell measurements or inter-frequency cell measurements. An intra-frequency RSTD measurement is performed when both the reference cell and the neighboring cell are on the same carrier frequency as the UE serving cell. An inter-frequency RSTD measurement is performed when at least one of the reference cell and the neighboring cell is on a different carrier frequency relative to the UE serving cell.

In OTDOA based DL positioning, UE 100 may measure time differences in received reference signals from a plurality of base stations 240. When positions of the base stations 240 are available, the observed time differences may be used to calculate the location of UE 100. The measured time difference of arrival of the PRS from a reference cell, which can be the serving cell, and one or more neighboring cells is known as the Reference Signal Time Difference (RSTD). The RSTD for a cell "k" relative to a reference cell "Ref", may be given as $(TOA_k-TOA_{Ref})$. Using the RSTD measurements, the absolute or relative transmission timing of each cell, and the known position(s) of base stations 240 for the reference and neighboring cells, the position of UE 100 may be calculated.

While RSTD measurements can be performed on any downlink signals (e.g., cell specific reference signals), Positioning Reference Signals (PRS) are often used to perform RSTD measurements from multiple cells to improve OTDOA positioning performance. PRS signals have a pre-defined bandwidth and a set of configuration parameters such as a subframe offset ($\Delta_{PRS}$), a periodicity ($T_{PRS}$), a duration ($N_{PRS}$), muting pattern, and muting sequence periodicity ($T_{REP}$). PRS is transmitted in pre-defined positioning subframes grouped by several consecutive subframes $N_{PRS}$, which are termed "positioning occasions." Positioning occasions occur periodically with the periodicity $T_{PRS}$.

In UE-assisted positioning, the UE may report measurements of wireless signals from base stations to a location server, which may determine the location of the UE based on the reported measurements. For example, in UE-assisted positioning, the TOA/OTDOA measurements may be sent to LS 250 (e.g. E-SMLC) by the UE 100.

In both the UE-based positioning and the UE-assisted positioning cases, using: (i) the RSTD measurements, (ii) the absolute or relative transmission timing of each neighboring cell, and (iii) the known position(s) of base stations 240 for the reference and neighboring cells, the position of UE 100 may be determined. When signal measurements (e.g. OTDOA/TOA measurements) from S+1 or more non-collocated base stations are available, and location information related to locations of the base stations is available, then, UE 100 may determine a S-dimensional ($1 \leq S \leq 3$) position based on signal measurements and the known locations of the base stations using multi-lateration. Multi-lateration may determine the position of UE 100 by determining a point of intersection of hyperbolas for time difference (RSTD/OTDOA) measurements, or by determining a point of intersection of circles for time of arrival (TOA) measurements.

In general, when sufficient wireless signal (e.g. WWAN/cellular measurements) are available at given time, techniques such as Advanced Forward Link Trilateration (AFLT), Time of Arrival (TOA), Observed Time Difference Of Arrival (OTDOA) or Enhanced Cell ID (E-CID) or combinations thereof may be used to determine the position of UE 100. In some of these techniques (e.g. AFLT, TOA and OTDOA), pseudoranges or timing differences may be measured at the UE 100 relative to (S+1) non-collocated base stations (or antennas or terrestrial transmitters, e.g. 240-1, 240-2, 240-3, and 240-4) at known locations. In some embodiments, the measurements may be based at least in part, on pilot signals, reference signals (e.g. PRS/CRS), or other positioning related signals transmitted by the base stations and received at the UE 100.

Figure 2B:
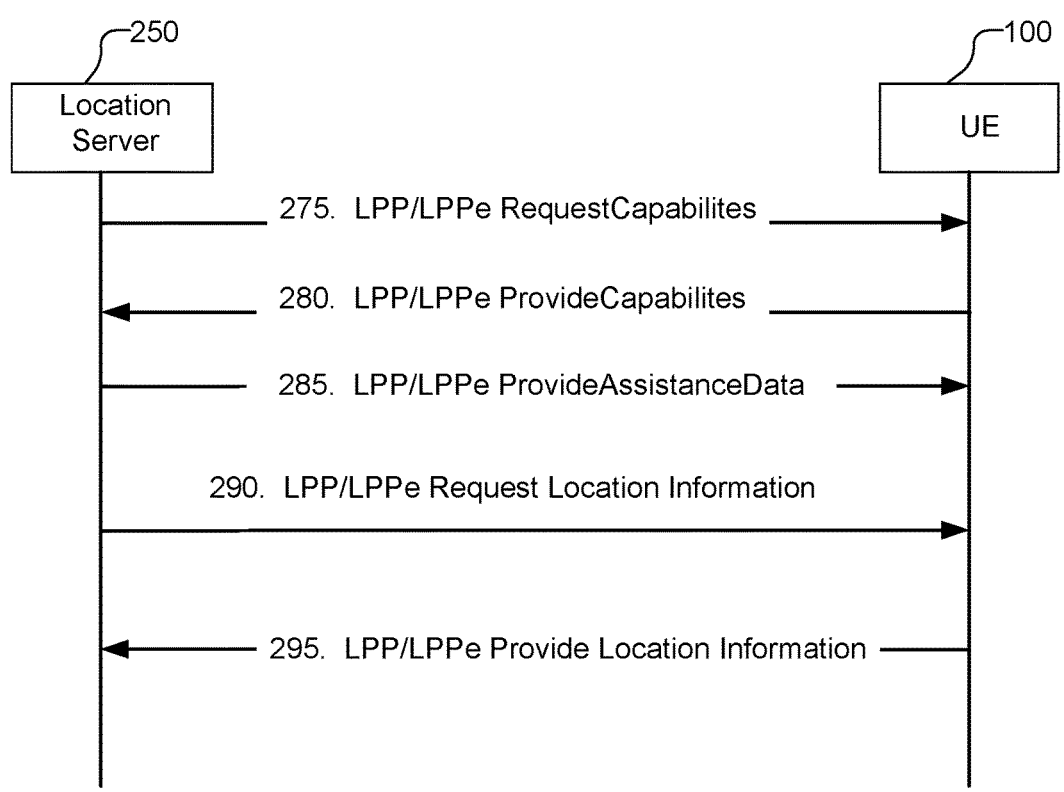
FIG. 2B illustrates an exemplary message flow for a procedure that supports transfer of assistance data from a location server to a UE, and transfer of location related information from a UE to a location server.

FIG. 2B illustrates an exemplary message flow for a procedure that supports transfer of assistance data from location server 250 to UE 100, and transfer of location related information from UE 100 to location server 250. In some embodiments, message flow For OTDOA positioning on LTE networks, LPP may be used for communication between location server 250 and UE 100 and may include message exchanges related to Capability Transfer, Assistance Data Transfer, and Location Information Transfer.

In some embodiments, in stage 275, location server 250 may send a RequestCapabilities message to UE 100 to indicate the type of capabilities supported by UE 100. The RequestCapabilities message, which requests the LPP/LPPe capabilities of UE 100, may include, among other parameters, a request for OTDOA capabilities supported by UE 100.

In some embodiments, in stage 280, UE 100 may respond with a ProvideCapabilities message to the server. The ProvideCapabilities message may include, among other parameters, an indication of UE OTDOA capabilities such as OTDOA mode supported, frequency bands, and/or support for inter-frequency RSTD measurements.

In some embodiments, in stage 285, location server 250 may send a ProvideAssistanceData message to UE 100, which may include OTDOA assistance data. The OTDOA assistance data may include an assistance data for a reference cell, and assistance data for neighbor cells. The OTDOA assistance data may include PRS assistance information for the reference cell and neighbor cells.

In some embodiments, in stage 290, location server 250 may send a RequestLocationInformation message to UE 100 to request RSTD measurements. The RequestLocationInformation message may include information elements such as location information type, desired accuracy of the location estimate, and response time.

In some embodiments, UE 100 may then perform the RSTD measurements between a reference cell and one or more neighbor cells based on the OTDOA assistance data received. In some embodiments, in stage 295, UE 100 may respond with the RSTD measurements in a ProvideLocationInformation message to location server 250. The ProvideLocationInformation message may include information elements such as: (i) a timestamp of the measurement set (e.g. in the form of the System Frame Number (SFN)); (ii) an identity of the reference cell used for calculating the RSTD; (iii) a quality of the TOA measurement from the reference cell; (iv) a neighbor cell measurements including: (a) identities of the measured neighbor cells, (b) RSTD measurements for neighbor cells, (c) quality of the RSTD measurements, etc.

In some embodiments disclosed herein, based on the received location assistance data (e.g. by LADP 158) from Location Server (LS) 250, UE 100 may obtain wireless measurements, which, in some instances, may be captured in conjunction with the capture of displacement sensor measurements (e.g. PDR/VDR, IMU etc). In some instances, when a measurement set is deficient, the number of base stations from which wireless signals are available for position determination may be less than desired in order to determine the position of UE 100 with some desired dimensionality. In some embodiments disclosed herein, wireless measurements from a plurality of deficient measurement sets (e.g. captured within some time interval of a position request) may be combined and used in conjunction with a baseline displacement to determine a location of UE 100. The baseline displacement may be determined from displacement sensor measurements. In some embodiments disclosed herein, the baseline displacement may be determined relative to another prior UE location and comprise for example, a distance and direction, or relative X, Y (and Z) coordinates defined relative to some other location, or by reference to a point, area or volume indicated on a map, floor plan or building plan.

UE 100 may request a location session via one of base stations 240. UEs 100 may also receive requests for a location session, e.g., initiated by an external client (e.g. LCS client 260). By way of example, an identification of the base station 240-1 (or a base station antenna) with which UE 100 is communicating may be used to provide a partial position fix based on prior knowledge of the location of BS 240-1 and its coverage area. Moreover, measurements such as a received signal strength indicator (RSSI) and/or round trip time (RTT) for signals to/from the local transceivers may be used to further specify a position of UE 100 as a distance from antennas. Conventionally, when measurements from S+1 or more non-collocated base stations 240 are available at a point in time, an S-dimensional position of the UE 100 may be determined.

In some implementations, location related measurements from displacements sensors such as: VIO (e.g. using camera(s) 180) and/or IMU 170, and/or PDR/VDR 172, RADAR, LIDAR etc, and/or other sensors in sensor bank 185 (e.g., barometer, altimeter, magnetometer, etc), may be used to obtain displacement information between two locations to aid in location determination. By way of example, pressure sensor measurements may be used to provide an estimate of elevation or floor that the UE 100 may be on. As a further example, captured images from a camera may be used for VIO to determine baseline displacement between two locations of UE 100.

In some instances, at the time of a position request, UE 100 may be unable to obtain signal (e.g. TOA measurements) from a sufficient number of wireless signal measurements (e.g. RS measurements) from non-collocated base stations 240 (e.g. LTE eNBs). For example, in some situations, one or more neighbor cell Reference Signals (RS) may be too weak to detect, for example, when the serving cell gets stronger, or due to other environmental factors that affect signal propagation. Thus, less than three non-collocated BS measurements may be available thereby potentially creating a positioning coverage "hole" near base stations, which may make reliable or robust DL positioning challenging. As another example, a sufficient number of RS may sometimes be unavailable in indoor environments. In the examples above, when performing wireless measurements at or around the time of the position request, UE 100 may obtain a deficient measurement set. In a conventional situation, UE 100 may be unable to determine its position based on the deficient wireless measurement set.

In some embodiments disclosed herein, UE location determination is facilitated in situations where the number of wireless signal measurements from non-collocated base stations is less than desired. For example, disclosed embodiments may facilitate 2D location determination when signal measurements from three or more base stations 240 are unavailable. For example, when measurements from three or more base stations are unavailable at the time the position request is received, displacement sensor measurements may be combined with previously stored deficient wireless signal measurement sets obtained within some interval of the current time to determine a current position of UE 100.

Figure 3:
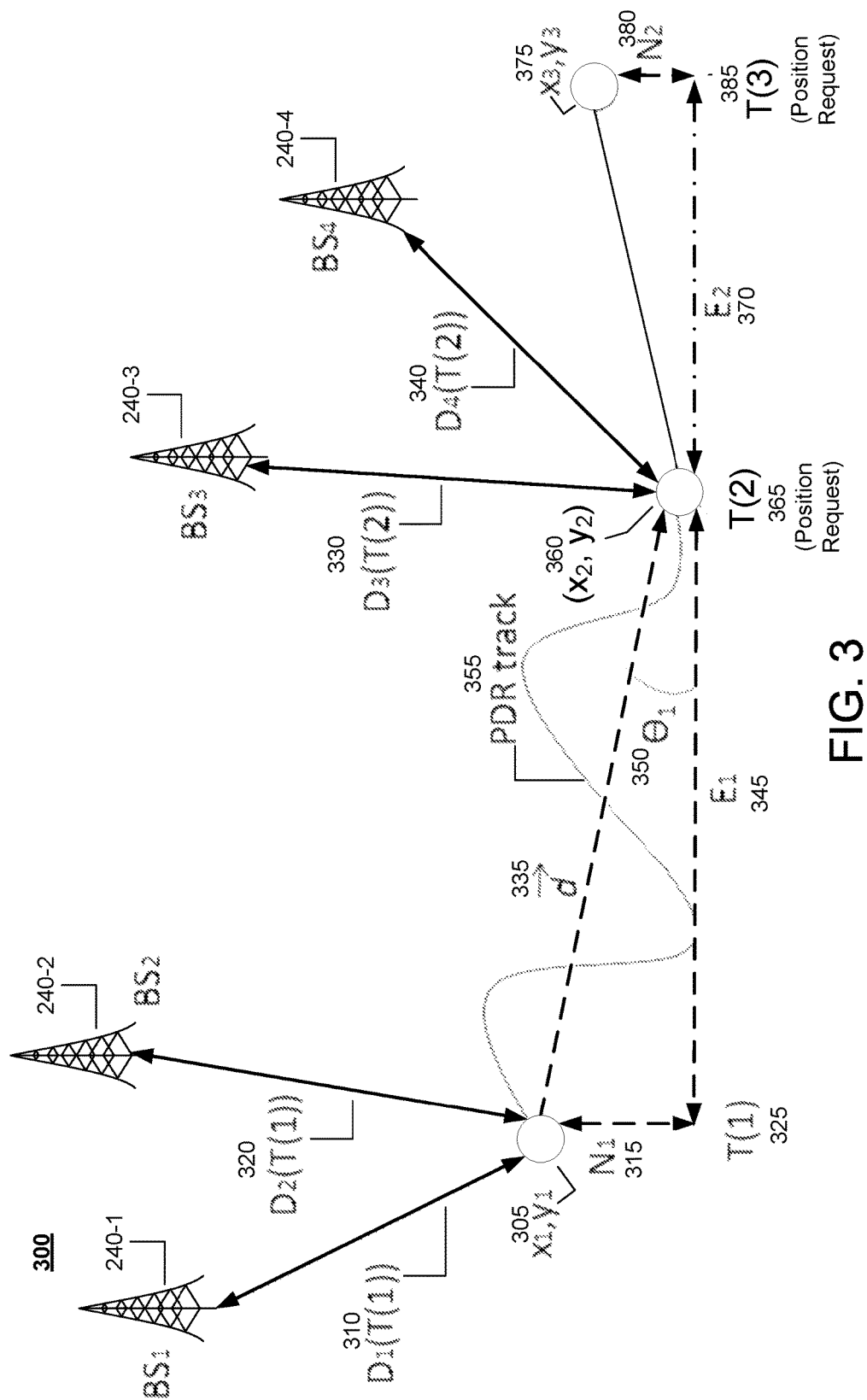
FIG. 3 shows a schematic diagram illustrating 2D location determination for a UE moving between locations in some frame of reference.

FIG. 3 shows a schematic diagram 300 illustrating 2D location determination for a UE moving between locations in some frame of reference. At some locations in FIG. 3, signal measurements from less than three base stations 240 may be available. In some embodiments, WWAN signal (e.g. RS) measurements by UE 100 from less than three base stations 240 may be combined with displacement sensor (e.g. IMU 170, /PDR/VDR 172, VIO, etc) measurements to determine a location of UE 100 as described further below.

In some embodiments, wireless (e.g. WWAN) measurements of base stations 240 may be obtained continuously, intermittently, periodically, or at specified/predetermined time intervals. In some embodiments, the wireless measurements may be obtained autonomously by UE 100. In some embodiments, the wireless measurements may be obtained autonomously by UE 100 and without any pending (or received) position request. In some embodiments, wireless measurements may be "always on." In some embodiments, the UE may be placed into a mode (e.g. navigation), where the wireless measurements may be "always on". In some embodiments, "always on" mode may be triggered when UE 100 is connected to a power source (e.g. in a vehicle) and/or based on available battery capacity.

In some embodiments, displacement sensor measurements may also be obtained continuously, or periodically, or at specified time intervals. In the description below, the term T(i) is used to represent the $i^{th}$ measurement at a point in time, while T(i−1) may represent the immediately preceding measurement.

In some implementations, the time interval between wireless signal measurements and/or displacement sensor measurements may be adjusted based on user-mobility. For example, in some instances, the measurement interval may be reduced as user-mobility increases, or the speed of UE movement increases. The degree of motion and/or speed may be determined, for example, based on the displacement sensor measurement. In some embodiments, WWAN signal measurements may be obtained periodically and time-stamped. When WWAN signal measurements are obtained in conjunction with, or within some time period of displacement sensor measurements, the WWAN signal measurements may be associated with the corresponding displacement sensor measurements and the wireless and displacement sensor measurements may be stored as measurement sets.

In FIG. 3, at time T(1) 325 (a first measurement set) and at a location (x$_1$, y$_1$) 305, wireless signals from non-collocated base stations BS$_1$ 240-1 and BS$_2$ 240-2 may be available for measurement by UE 100. UE 100 may obtain measurements at T(1) autonomously and without receiving a position request. Based on the wireless measurements (e.g. TOA, RTT, etc), UE 100 may determine a distance D$_1$(T(1)) 310 between UE location (x$_1$, y$_1$) 305 and BS$_1$ 240-1 and a distance D$_2$(T(1)) 320 between UE location (x$_1$, y$_1$) 305 and BS$_1$ 240-2. However, at time T(1) 325 and at location (x$_1$, y$_1$) 30, UE 100 may not be able to obtain measurements of three or more non-collocated base stations 240. In other words, the first measurement set at time T(1) may be a deficient measurement set because UE 100 may not be able to determine the 2D position given by values of coordinates (x$_1$, y$_1$) 305 based solely on the wireless measurements obtained in the first measurement set at time T(1).

In some embodiments, UE 100 may also obtain displacement sensor measurements (e.g. measurements from one or more of IMU 170, PDR/VDR 172, VIO, LIDAR, RADAR, etc) at time T(1), associate the displacement sensor measurements with wireless signal measurements from base stations BS$_1$ 240-1 and BS$_2$ 240-2, and store the wireless and displacement sensor measurements as a measurement set for time T(1) 325. UE 100 may continue to obtain displacement sensor measurements, continuously or periodically at time subsequent to T(1). Accordingly, for example, as shown in FIG. 3, UE 100 may follow exemplary PDR track 355 to position (x$_2$, y$_2$) 360 at time T(2) 365. In general, any displacement sensor based method (using PDR/VDR 172, IMU 170, VIO, LIDAR, RADAR, etc) may be used to obtain a trajectory of UE 100 and the use of PDR in FIG. 3 is merely exemplary.

In some embodiments, PDR may measure steps, Relative Turn Angles (RTA), COG, and uncertainties related to the above measurements at various times between T(1) 325 and T(2) 365.

At time T(2) 365, UE 100 may be location (x$_2$, y$_2$) 360 and may receive a position request. At position (x$_2$, y$_2$) 360 and time T(2), UE 100 may once again see less than three non-collocated base stations 240. Thus, the second measurement set at time T(2) 365 may also be a deficient measurement set. For example, as shown in FIG. 3, at time T(2) 365 and location (x$_2$, y$_2$) 360, UE 100 may measure wireless signals from two non-collocated base stations BS$_3$ 240-3 and BS$_4$ 240-4. Because the measurement set obtained at time T(2) 365 is a deficient measurement set, UE 100 may not be able to determine the 2D location given by coordinates (x$_2$, y$_2$) 360 based solely on the wireless measurements at time T(2) 365.

In some embodiments, based on the wireless measurements (e.g. TOA, RTT, etc), UE 100 may determine a distance D$_3$(T(2)) 330 between UE location (x$_2$, y$_2$) 360 and BS$_3$ 240-3 and a distance D$_4$(T(2)) 340 between UE location (x$_2$, y$_2$) 360 and BS$_4$ 240-4. In some embodiments, UE 100 may also use displacement sensor measurements to determine a baseline displacement vector $\vec{d}$ 335 between positions (x$_1$, y$_1$) 305 and (x$_2$, y$_2$) 360. For example, the displacement vector $\vec{d}$ 335 may comprise a magnitude of the baseline displacement and an angle $\theta_1$ relative to the X-axis (horizontal axis) of a frame of reference centered along an axis of UE 100 at (x$_2$, y$_2$) 360. In some embodiments, the baseline displacement vector $\vec{d}$ 335 may be obtained based on displacement and COG measurements using PDR on UE 100.

If the sum of the number or distinct non-collocated base stations measured by UE 100 at times T(1) 325 and T(2) 365 is at least 3, then, in some embodiments, UE 100 may determine current UE 2D location (x$_2$, y$_2$) 360 based on a combination of: (a) the ranges D$_1$(T(1)) 310, D$_2$(T(1)) 320, D$_3$(T(2)) 330, and D$_4$(T(2)) 340 from wireless measurements by UE 100 at T(1) 325 and T(2) 365; (b) the displacement vector $\vec{d}$ 335 between positions (x$_1$, y$_1$) 305 and (x$_2$, y$_2$) 360 (e.g. obtained from PDR 172 in FIG. 3); and (c) the known positions of base stations 240-1, 240-2, 240-3, and 240-4.

The ranges D$_1$, D$_2$, D$_3$, and D$_4$ of Base Stations 240-1, 240-2, 240-3, and 240-4, respectively, may be written as $$D_1(T(1)) = \sqrt{(x_1 - x_{BS_1})^2 + (y_1 - y_{BS_1})^2} \tag{1}$$

$$D_2(T(1)) = \sqrt{(x_1 - x_{BS_2})^2 + (y_1 - y_{BS_2})^2} \tag{2}$$

$$D_3(T(2)) = \sqrt{(x_2 - x_{BS_3})^2 + (y_2 - y_{BS_3})^2} \tag{3}$$

$$D_4(T(2)) = \sqrt{(x_2 - x_{BS_4})^2 + (y_2 - y_{BS_4})^2} \tag{4}$$

Further, by subtracting equation (2) from equation (1), $$D_1(T(1)) - D_2(T(1)) = \sqrt{(x_1 - x_{BS_1})^2 + (y_1 - y_{BS_1})^2} - \sqrt{(x_1 - x_{BS_2})^2 + (y_1 - y_{BS_2})^2} \tag{5}$$

and subtracting equation (4) from equation (3), yields $$D_3(T(2)) - D_4(T(2)) = \sqrt{(x_2 - x_{BS_3})^2 + (y_2 - y_{BS_3})^2} - \sqrt{(x_2 - x_{BS_4})^2 + (y_2 - y_{BS_4})^2} \tag{6}$$

Further, by substituting $x_2 = x_1 + \vec{d}\cos(\theta_1)$ and $y_2 = y_1 + \vec{d}\sin(\theta_1)$ in equation (6), where, the equations may be solved for $x_1$ and $y_1$. Equation (6) may thus be re-written as $$\sqrt{\left((x_1 + \vec{d}\cos\theta) - x_{BS_3}\right)^2 + \left((y_1 + \vec{d}\sin\theta) - y_{BS_3}\right)^2} - \sqrt{\left((x_1 + \vec{d}\cos\theta) - x_{BS_4}\right)^2 + \left((y_1 + \vec{d}\sin\theta) - y_{BS_4}\right)^2} = D_3(T(2)) - D_4(T(2)) \quad (7)$$

The position $p_1 = (x_1, y_1)$ of UE 100 at T(1) may be obtained because the position of base station $BS_1$ 240-1 given by $(x_{BS_1}, y_{BS_1})$ and the position of base station $BS_2$ 240-2 given by $(x_{BS_2}, y_{BS_2})$ are both known. Further, $\vec{d}$ and $\theta_1$ are known from displacement sensor (e.g. PDR/VDR 172) measurements, and $D_1(T1)$, $D_2(T1)$, $D_3(T2)$, and $D_4(T2)$ are known from wireless signal (e.g. RS) measurements of $BS_1$, $BS_3$, $BS_3$, and $BS_4$, respectively. The position $p_2 = (x_2, y_2)$ of UE 100 at T(2) may then be obtained as:

$$x_2 = x_1 + \vec{d}\cos(\theta_1) \text{ and} \quad (8)$$

$$y_2 = y_1 + \vec{d}\sin(\theta_1) \quad (9)$$

Equations (8) and (9) may be used to obtain the location $p_2 = (x_2, y_2)$ of UE 100 at T(2).

When clock biases are present on clocks in UE 100, the accuracy of position determination may be affected. To account for the clock biases, equations (1)-(4) above may be rewritten as:

$$D_1(T(1)) = \sqrt{(x_1 - x_{BS_1})^2 + (y_1 - y_{BS_1})^2} + b(T(1)) \quad (10)$$

$$D_2(T(1)) = \sqrt{(x_1 - x_{BS_2})^2 + (y_1 - y_{BS_2})^2} + b(T(1)) \quad (11)$$

$$D_3(T(2)) = \sqrt{(x_2 - x_{BS_3})^2 + (y_2 - y_{BS_3})^2} + b(T(2)) \quad (12)$$

$$D_4(T(2)) = \sqrt{(x_2 - x_{BS_4})^2 + (y_2 - y_{BS_4})^2} + b(T(2)) \quad (13)$$

When subtracting equations (11) from equation (10) and equations (13) from equation (12), the clock biases are removed. Thus, in instances, where UE clock biases vary with time, measurements from two non-collocated base stations at each measurement time (e.g. T(1) and T(2)) may be used differentially to remove the clock biases and improve positioning accuracy.

$$D_1(T(1)) - D_2(T(1)) = \sqrt{(x_1 - x_{BS_1})^2 + (y_1 - y_{BS_1})^2} + b(T(1)) - \sqrt{(x_1 - x_{BS_2})^2 + (y_1 - y_{BS_2})^2} - b(T(1)) \quad (14)$$

and subtracting equation (13) from equation (12), yields $$D_3(T(2)) - D_4(T(2)) = \sqrt{(x_2 - x_{BS_3})^2 + (y_2 - y_{BS_3})^2} + b(T(2)) - \sqrt{(x_2 - x_{BS_4})^2 + (y_2 - y_{BS_4})^2} - b(T(2)) \quad (15)$$

Equations (14) and (15) above may be rewritten as $$D_1(T(1)) - D_2(T(1)) = \sqrt{(x_1 - x_{BS_1})^2 + (y_1 - y_{BS_1})^2} - \sqrt{(x_1 - x_{BS_2})^2 + (y_1 - y_{BS_2})^2} \quad (16)$$

$$D_3(T(2)) - D_4(T(2)) = \sqrt{(x_2 - x_{BS_3})^2 + (y_2 - y_{BS_3})^2} - \sqrt{(x_2 - x_{BS_4})^2 + (y_2 - y_{BS_4})^2} \quad (17)$$

Equations (16) and (17) are the same as equations (5) and (6) earlier. Therefore, the equations may be solved as outlined above to obtain values of position $p_1 = (x_1, y_1)$ of UE 100 at T(1) and position $p_2 = (x_2, y_2)$ of UE 100 at T(2).

In instances where the clock biases are time-invariant—i.e. the clock bias is some fixed unknown value b, then displacement sensor measurements may be combined with wireless measurements from at least 3 non-collocated base stations at distinct times T(1) and T(2) to obtain positions $p_1 = (x_1, y_1)$ of UE 100 at T(1) and position $p_2 = (x_2, y_2)$ of UE 100 at T(2)

To account for time-invariant clock biases, equations (1)-(3) above may be rewritten as:

$$D_1(T(1)) = \sqrt{(x_1 - x_{BS_1})^2 + (y_1 - y_{BS_1})^2} + b \quad (18)$$

$$D_2(T(1)) = \sqrt{(x_1 - x_{BS_2})^2 + (y_1 - y_{BS_2})^2} + b \quad (19)$$

$$D_3(T(2)) = \sqrt{(x_2 - x_{BS_3})^2 + (y_2 - y_{BS_3})^2} + b \quad (20)$$

When subtracting equations (20) and (19) from equation (18), the time invariant clock bias b is removed. Thus, in instances where UE clock bias is time-invariant, wireless measurements from three non-collocated base stations obtained from a plurality of deficient measurement sets may be used differentially to remove the clock bias and improve positioning accuracy.

$$D_1(T(1)) - D_2(T(1)) = \sqrt{(x_1 - x_{BS_1})^2 + (y_1 - y_{BS_1})^2} + b - \sqrt{(x_1 - x_{BS_2})^2 + (y_1 - y_{BS_2})^2} - b \quad (21)$$

$$D_1(T(1)) - D_3(T(2)) = \sqrt{(x_1 - x_{BS_1})^2 + (y_1 - y_{BS_1})^2} + b - \sqrt{(x_2 - x_{BS_3})^2 + (y_2 - y_{BS_3})^2} - b \quad (22)$$

Equations (21) and (22) above may be rewritten as $$D_1(T(1)) - D_2(T(1)) = \sqrt{(x_1 - x_{BS_1})^2 + (y_1 - y_{BS_1})^2} - \sqrt{(x_1 - x_{BS_2})^2 + (y_1 - y_{BS_2})^2} \quad (23)$$

$$D_1(T(1)) - D_3(T(2)) = \sqrt{(x_1 - x_{BS_1})^2 + (y_1 - y_{BS_1})^2} - \sqrt{(x_2 - x_{BS_3})^2 + (y_2 - y_{BS_3})^2} \quad (24)$$

Further, by substituting $x_2 = x_1 + \vec{d}\cos(\theta_1)$ and $y_2 = y_1 + \vec{d}\sin(\theta_1)$ in equation (24), where, the equations may be solved for $x_1$ and $y_1$. Equation (24) may thus be re-written as $$\sqrt{((x_1 - x_{BS_1})^2 + (y_1 - y_{BS_1})^2} - \sqrt{\left((x_1 + \vec{d}\cos\theta) - x_{BS_3}\right)^2 + \left((y_1 + \vec{d}\sin\theta) - y_{BS_3}\right)^2} = D_1(T(1)) - D_3(T(2)) \quad (25)$$

Equation (25) may be solved to obtain the position $p_1 = (x_1, y_1)$ of UE 100 at T(1) because the position of base station $BS_1$ 240-1 given by $(x_{BS_1}, y_{BS_1})$ and the position of base station $BS_3$ 240-3 given by $(x_{BS_3}, y_{BS_3})$ are both known. Further, $\vec{d}$ and $\theta_1$ are known from displacement sensor (e.g. PDR/VDR 172) measurements, and $D_1(T1)$, $D_2(T1)$, and $D_3(T2)$, are known from wireless signal (e.g. RS) measurements of $BS_1$, $BS_3$, $BS_3$, and $BS_4$, respectively. The position $p_2 = (x_2, y_2)$ of UE 100 at T(2) may then be obtained as:

$$x_2 = x_1 + \vec{d}\cos(\theta_1) \text{ and} \quad (26)$$

$$y_2 = y_1 + \vec{d}\sin(\theta_1) \quad (27)$$

Equations (26) and (27) may be used to obtain the location $p_2 = (x_2, y_2)$ of UE 100 at T(2). Thus, in situations with time-invariant clock bias, displacement sensor measurements may be combined with wireless measurements from S+1 non-collocated base stations from a plurality of deficient measurement sets to obtain a position of UE 100.

In general, UE 100 may determine a location of UE 100 at a given time T(i), if the sum of the number of distinct non-collocated base stations from which wireless signal measurements were obtained in the deficient measurement sets in a time interval ($\Delta T$) preceding a position request exceeds the requested dimensionality of the position request. Thus, the position of UE may be determined in 2D, if the sum of number of distinct non-collocated base stations from which wireless signal measurements were obtained in the deficient measurement sets between T and T−$\Delta T$ is at least three. In addition, when time-variant clock biases are present, to eliminate inaccuracies resulting from clock biases, wireless signal measurements from at least two non-collocated base stations can be obtained in each deficient measurement set.

For example, when clock on UE 100 exhibits a time varying bias, a 2D (S=2) position of UE 100 may be obtained by combining displacement sensor measurements with wireless measurements from at least 3 (S+1=2+1=3) non-collocated base stations. In the example above, the wireless measurements may be obtained using at least two distinct deficient measurement sets and each deficient measurement set may include measurements from at least two base stations (to eliminate inaccuracies from the time varying clock bias).

Similarly, when clock on UE 100 exhibits a time varying bias, the position of UE may be determined in 3D (S=3), if the sum of number of distinct non-collocated base stations from which wireless signal measurements were obtained in the deficient measurement sets between T and T−$\Delta T$ is at least 4 (S+1=3+1=4). In the example above, the wireless measurements may be obtained using two or more distinct deficient measurement sets and each deficient measurement set may include measurements from at least two base stations (to eliminate inaccuracies from the time varying clock bias).

In some embodiments, displacement sensor measurements may be used to determine a 2D location of UE 100 based on the methods outlined above. Further, after the 2D location is determined, barometer and/or altimeter measurements may be used to obtain a 3D location of UE 100.

Next, UE 100 may move to position $p_3=(x_3, y_3)$ at time T(3) 385, where it may receive another position request. At time T(3), various situations are possible and described below.

If UE 100 is able to obtain measurements of 3 or more non-collocated base stations 240, then, UE 100 may directly determine its 2D position $p_3=(x_3, y_3)$ at time T(3) 385 based on the measurements of the 3 or more non-collocated base stations 240 seen at $p_3=(x_3, y_3)$ at time T(3). The measurements obtained by UE 100 at $p_3=(x_3, y_3)$ at time T(3) 385 may be timestamped and stored. Further, in some embodiments, when a 2D location $p_i$ is determined based on simultaneous measurements of 3 or more non-collocated base stations 240 at some point in time T(i) (e.g. T(3)) then the location $p_3=(x_3, y_3)$ may be stored and earlier stored measurements may be purged.

On the other hand, if UE 100 can measure less than 3 non-collocated base stations 240 at position $p_3=(x_3, y_3)$ 375 at time T(3) 385 (deficient third measurement set), then, in some embodiments, if the total number of base stations from which UE 100 has obtained measurements during some time interval $\Delta T$ preceding T(3) 385 is at least 3, then position $p_3=(x_3, y_3)$ 375 at time T(3) 385 may be determined based on the measurements at time T(3) 385 and during the interval T(3)−$\Delta T$. For example, if $\Delta T$ corresponds to the time difference between T(3) and T(2), then position $p_3=(x_3, y_3)$ 375 at time T(3) 385 of UE 100 may be obtained by determining N2 380 and E2 370, based on the relative displacement of UE 100 from previously determined position $p_2=(x_2, y_2)$ of UE 100 at T(2) as outlined above.

Further, if UE 100 exhibits a time varying clock bias, then, measurements from at least two non-collocated base stations may be obtained in each of the deficient measurement sets that are used to determine $p_3=(x_3, y_3)$ 375. For example, to eliminate inaccuracies caused by time varying clock bias, a deficient measurement set at time T(2) 365 and a deficient measurement set at time T(3) 385 may both be used to determine 2D position $p_3=(x_3, y_3)$ 375 of UE 100, when: (a) a total of at least 3 non-collocated base station measurements are available (in the deficient measurement sets at T(2) 365 and T(3) 385); and (b) measurements from at least two non-collocated base stations are available in each of the deficient measurement sets.

The time interval $\Delta T$ may be adjusted based on the accuracy desired, the drift or bias of the displacement sensor over time, the speed of movement of UE 100, user preferences etc. For example, in some embodiments, the time interval $\Delta T$ may be inversely proportional to the speed of UE 100 or the motion of UE 100. Thus, in some embodiments, $\Delta T$ may be reduced as UE 100 moves faster or as movement increases. In some embodiments, the speed of movement or degree of motion of UE 100 may be determined based on sensor inputs (e.g. IMU 170, PDR/VDR 172, VIO etc) or other techniques.

In some embodiments, the position of UE 100 may also be determined based on time of arrival measurements. For example, when clock bias is stable, the times of arrival of signals at UE 100 may be used to determine ranges e.g. $D_1(T1)$, and $D_2(T1)$ at position $p_1=(x_1, y_1)$ 305, or ranges $D_3(T2)$, and $D_4(T2)$ at $p_2=(x_2, y_2)$.

Figure 4:
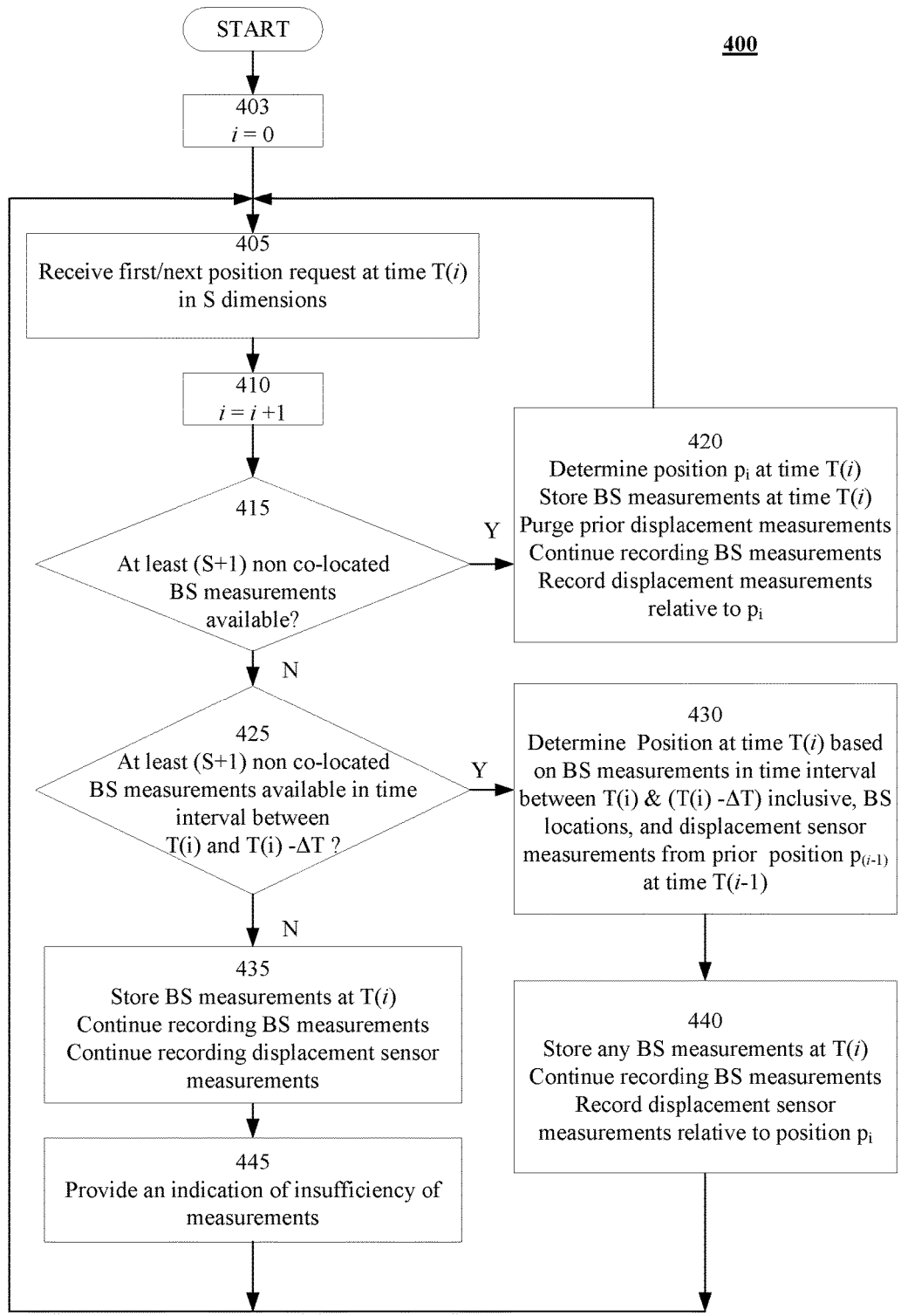
FIG. 4 shows an exemplary flowchart for hybrid wireless-displacement sensor positioning according to some disclosed embodiments.

FIG. 4 shows an exemplary flowchart for hybrid wireless-displacement sensor positioning according to some disclosed embodiments. In some embodiments, method 400 may be performed by UE 100. In some embodiments, method 400 may be performed by processor(s) 150 on UE 100. In some embodiments, the method may be performed by PE 156. In some embodiments, the method may be performed by processor(s) 150 and/or PE 156 based on measurements of wireless signals received by transceiver 110, location assistance data (e.g. OTDOA assistance data, BS location etc) received by LADP 158, displacement sensor measurements (e.g. IMU 170, PDR/VDR, VIO) and optionally from other sensor measurements (e.g. altimeter/barometer, etc.).

During performance of method 400, wireless signal measurements may be obtained continuously, intermittently, periodically and/or at specified/predetermined time intervals. Similarly, displacement sensor measurement may also be obtained continuously, periodically and/or at specified/predetermined time intervals.

In some embodiments, the frequency of displacement measurements may be varied based on system parameters, including sensor characteristics, accuracy desired, resources available on UE 100 (e.g. available processor resources, memory, power consumption, battery capacity etc).

After commencing, in block 403, a counter i may be initialized and set to 0. Next, in block 405, a position request for the location of UE 100 may be received at time T(i). For example, a position request may be initiated by Location Server 250 on behalf of LCS client 260. As another example, the position request may be initiated by a user of UE 100 and/or an application on UE 100. A position of UE 100 may be requested in S dimensions, where 2≤S≤3.

In block 410, the counter i may be incremented to reflect the first/next incoming position request. In block 415, it may be determined if wireless measurements from at least (S+1) or more non-collocated base stations 240 are available. For example, the determination whether (S+1) or more base stations 240 are collocated may be based on location assistance information (e.g. received by UE 100) that may specify locations of base stations 240.

In block 415, if wireless measurements from at least (S+1) or more non-collocated base stations 240 are available ("Y" in block 415), then, in block 420, a location $p_i=(x_i, y_i)$ of UE 100 at time T(i) may be determined based on the wireless signal measurements from the (S+1) or more non-collocated base stations 240. In some embodiments, any prior/stored displacement sensor and base station measurements relative to a prior position (e.g. $p_{i-1}=(x_{i-1}, y_{i-1})$ at time T(i−1)) may be discarded. In some embodiments, displacement measurements relative to $p_i=(x_i, y_i)$ of UE 100 at time T(i) may be recorded. Further, in block 420, the recording of base station measurements and displacement sensor measurements may be continued.

In block 415, if wireless measurements from at least (S+1) or more non-collocated base stations 240 are unavailable ("N" in block 415), then, in block 425, it may be determined whether at least (S+1) non-collocated base stations 240 wireless measurements were made in the time interval between T(i) and T(i)−ΔT (inclusive of both time T(i) and time T(i)−ΔT) where ΔT is some specified time interval prior to T(i).

For example, wireless measurements from a set of $N_1$ base stations (e.g. 240-1 and 240-2) may be available (or measured) at time T(i) and a further measurements of wireless signals from a set of $N_2$ base stations (e.g. 240-3 and 240-4) may have been made at some point during the (ΔT) time interval between T(i) and T(i)−ΔT. In block 425, it may be determined if the total number of distinct non-collocated base stations in $N_1$ and $N_2$ is at least (S+1).

In block 425, if wireless measurements from at least (S+1) non-collocated base stations 240 were made in the time interval between T(i) and T(i)−ΔT inclusive ("Y" in block 425), then, in block 430, a location $p_i=(x_i, y_i)$ of UE 100 at time T(i) may be determined: (i) based on the wireless signal measurements between T(i) and T(i)−ΔT inclusive, (ii) displacement measurements (e.g. $\vec{d}$ and COG and/or $\theta_i$, where $\vec{d}$ is the displacement relative to a previous position $p_{i-1}= (x_{i-1}, y_{i-1})$ at time T(i−1)), and (iii) the known locations of the non-collocated base stations 240 measured in the time interval between T(i) and T(i)−ΔT (both inclusive). In some embodiments, the location $p_i=(x_i, y_i)$ of UE 100 at time T(i) may be stored and block 440 may be invoked.

In some embodiments, when UE 100 exhibits time-variant clock bias, then, in block 425, it may determined whether: (a) at least (S+1) non-collocated base stations 240 wireless measurements were made in the time interval between T(i) and T(i)−ΔT; and (b) measurements from at least two non-collocated base stations were obtained in each of the deficient measurement sets during the (ΔT) time interval between T(i) and T(i)−ΔT. If both conditions (a) and (b) above are satisfied, then, in block 430, a location $p_i=(x_i, y_i)$ of UE 100 at time T(i) may be determined and clock bias related positional inaccuracies may be removed or mitigated. In some embodiments, in block 430, in an instance where UE 100 exhibits time varying clock bias, the location $p_i=(x_i, y_i)$ of UE 100 at time T(i) may be determined: (i) based on those deficient measurement sets between T(i) and T(i)−ΔT (both inclusive) in which at least two non-collocated base stations were measured, (ii) displacement measurements (e.g. $\vec{d}$ and COG and/or $\theta_i$, where $\vec{d}$ is the displacement relative to a previous position $p_{i-1}=(x_{i-1}, y_{i-1})$ at time T(i−1)), and (iii) the known locations of the non-collocated base stations 240 measured in the time interval between T(i) and T(i)−ΔT (both inclusive). In some embodiments, the location $p_i=(x_i, y_i)$ of UE 100 at time T(i) may be stored and block 440 may be invoked.

In block 440, wireless signal measurements of base stations 240 that are measured at time T(i) (in block 430) and may be stored. Further, displacement sensor measurements may be recorded relative to position $p_i=(x_i, y_i)$ of UE 100 at time T(i). The recording of both wireless signal base station measurements and displacement sensor measurements may be continued.

In block 425, if wireless measurements from at least (S+1) non-collocated base stations 240 were not made in the time interval between T(i) and T(i)−ΔT inclusive ("N" in block 425), then, in block 435, any wireless signal measurements of base stations 240 that are measured at time T(i) and may be stored. Further, displacement sensor measurements may be recorded. The recording of both wireless signal base station measurements and displacement sensor measurements may be continued.

In block 445, in response to the position request, an indication of a deficient measurement session may be provided. In some embodiments, the response may include any wireless signal measurements of base stations performed in conjunction with the position request.

In some embodiments, another iteration may then be commenced in block 405.

FIG. 5 shows an exemplary measurement table 500 indicating some of the information that may be received and/or measured and/or determined, and stored by UE 100. Measurement table 500 is merely exemplary, and may include additional fields with information derived from UE measurements. For example, measurement table 500 may also include altimeter and/or barometer measurements and/or an altitude determined from altimeter/barometer measurements (not shown in FIG. 5). In some embodiments, one or more fields shown in measurement table 500 may be omitted and may derived on demand based on other stored measurements and/or at the time a position request is received.

Each record and/or measurement in measurement table 500 may be timestamped with Timestamp 505 indicating the time of measurement t. In some embodiments, the information in measurement table 500 may be captured and stored over a ΔT time period. In some embodiments, as new measurements are captured and added to measurement table 500 at a current time, measurements from times prior to the ΔT time interval may be deleted.

In some embodiments, measurement table 500 may be stored in memory 130 on UE 100. In some embodiments, each record (e.g. a row) in measurement table 500 may comprise a measurement set.

In some embodiments, records in measurement table 500 may be indexed by and/or searchable by one or more fields including, timestamp 505, any determined UE location 530 (during some time interval ΔT), base station identifier BS ID 510, which may hold an identifier $BS_j$ for each base station 240-j measured by UE 100.

A record in measurement table 500 may also include fields for the location of a base station shown as BS location 515. For example, BS locations 515 may be received as part of location assistance data by a UE 100. Each measurement record may include: displacement sensor measurements 535 (e.g. ($\vec{d}$, COG)) relative to the most recently determined position, and/or other derived measurements; any base station wireless signal (e.g. RS, TOA, OTDOA) measurements W(BS$_j$) 525; and determined ranges of base stations D$_{BSj}$ 530 for each measured base station BS$_j$.

In some embodiments, measurement table 500 may include location request indication 540 to indicate whether the measurement record was created in response to a location request, and if so, may include the determined UE location 530.

In some embodiments, information in measurement table 500 may be used to facilitate performance of method 400 and determine a location of UE when a location request is received. For example, UE 100 may determine: (i) the most recent UE location 530, (b) the number of distinct non-collocated base stations form which wireless signal measurements were obtained during time interval ΔT, (iii) whether two or more base stations were observed during some measurement set, (iv) non-collocated base station locations 515, (v) displacement sensor measurements 535 relative to the most recent UE location 530. As described above, one or more of the above measurements/information may be used for UE location determination in instances where a measurement set is deficient.

Figure 6:
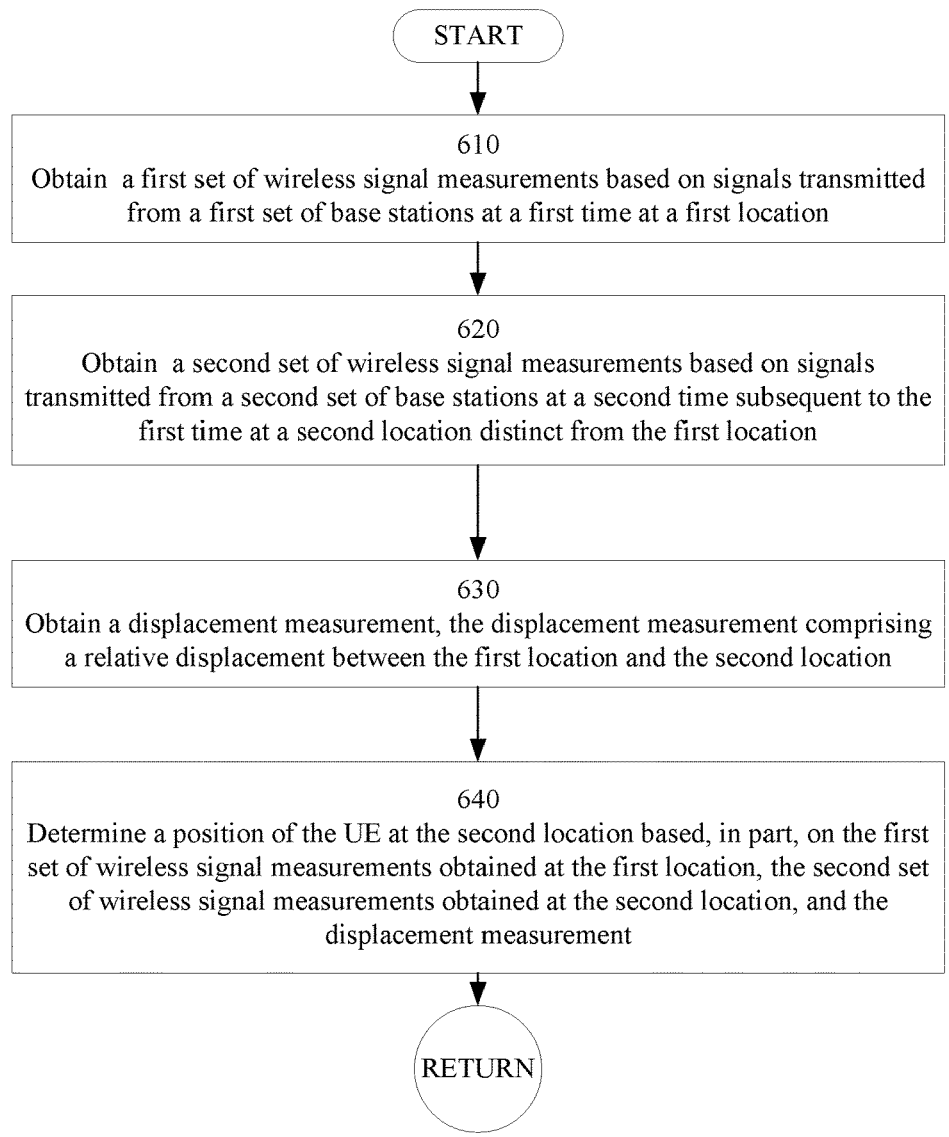
FIG. 6 shows an exemplary flowchart for hybrid wireless-displacement sensor positioning according to some disclosed embodiments.

FIG. 6 shows an exemplary flowchart of a method 600 for hybrid wireless-displacement sensor positioning according to some disclosed embodiments. In some embodiments, method 400 may be performed by UE 100. In some embodiments, method 600 may be performed by processor(s) 150 on UE 100. In some embodiments, the method may be performed by PE 156. In some embodiments, method 600 may be performed by processor(s) 150 and/or PE 156 based on measurements of wireless signals received by transceiver 110, location assistance data (e.g. OTDOA assistance data, BS location etc) received by LADP 158, displacement sensor measurements (e.g. IMU 170, PDR/VDR 172, VIO, RADAR, LIDAR, etc) and optionally from other sensor measurements (e.g. altimeter/barometer, etc.).

During performance of method 600, wireless signal measurements may be obtained continuously, intermittently, periodically and/or at specified/predetermined time intervals. Similarly, displacement sensor measurement may also be obtained continuously, periodically and/or at specified/predetermined time intervals.

In some embodiments, in block 610, a first set of wireless signal measurements based on signals transmitted from a first set of base stations at a first time at a first location of the UE may be obtained. In some embodiments, the first set of wireless signal measurements may constitute a deficient measurement set. In some embodiments, the first set of wireless measurements may be obtained autonomously by the UE. In some embodiments, the first set of wireless measurements may be obtained autonomously by the UE without a pending or received position determination request.

In block 620, a second set of wireless signal measurements based on signals transmitted from a second set of base stations may be obtained. The second set of wireless measurements may be obtained at a second time subsequent to the first time at a second location of the UE distinct from the first location. In some embodiments, the second set of wireless signal measurements may constitute a deficient measurement set. In some embodiments, the second set of wireless signal measurements may be obtained in response to a position request received by the UE. In some embodiments, the second set of base stations may comprise at least two non-collocated second base stations.

In some embodiments, the first set of wireless signal measurements and the second set of wireless measurements may comprise one of: Observed Time Difference of Arrival (OTDOA) measurements; Reference Signal Time Difference (RSTD) measurements, or Time of Arrival (ToA) measurements.

In block 630, a displacement measurement may be obtained, wherein the displacement measurement may comprise a relative displacement between the first location and the second location. In some embodiments, the displacement measurement may be obtained in the form of a displacement vector. For example, the displacement measurement may comprise a relative displacement between the first location and the second location, and a corresponding direction between the first location and the second location. In some embodiments, the displacement measurement may be based on at least one of: Pedestrian Dead Reckoning (PDR) measurements; or Vehicular Dead Reckoning (VDR) measurements; or Inertial Measurement Unit (IMU) measurements; or Visual Inertial Odometry (VIO) measurements; or Light Detection And Ranging (LIDAR) measurements; or Radio Detection And Ranging (RADAR) measurements; or some combination thereof.

In block 640, a position of UE 100 at the second location may be determined. The position of UE 100 may be determined based, in part, on the first set of wireless signal measurements obtained at the first location, the second set of wireless signal measurements obtained at the second location, and the displacement measurement. In some embodiments, determining the position of the UE at the second location may comprise: receiving, as location assistance data, a corresponding location of each base station in the first set of base stations and a corresponding location of each base station in the second set of base stations; and determining the position of the UE based further on the locations of base stations in the first set of base stations and the locations of base stations in the second set of base stations.

In some embodiments, the second set of wireless signal measurements may be obtained in response to a position request received by the UE and method 600 may further comprise: providing, in response to the position request, the determined position of the UE at the second location.

In some embodiments, the second set of wireless signal measurements may be obtained in response to a position request received by the UE. Further, a first number or count of base stations in the first set of base stations may be less than a dimensionality specified in the position request and a second number or count of base stations in the second set of base stations may be less than the dimensionality specified in the position request. Further, in some embodiments, a sum of the first number of base stations and the second number of base stations may be greater than the dimensionality specified in the position request.

In some embodiments, the first set of wireless signal measurements may comprises, for each base station in the first set of base stations, a corresponding first Reference Signal Time Difference (RSTD) measurement relative to a first reference cell base station, wherein the first reference cell base station may form part of the first set of base stations. Further, the second set of wireless signal measurements may comprise, for each base station in the second set of base stations, a corresponding second RSTD measurement relative to a second reference cell base station, wherein the second set of base stations may comprise at least two non-collocated base stations and the second reference cell base station may form part of the second set of base stations.

In some embodiments, method 600 may further comprise: determining a position of the UE at a third location based on an additional displacement measurement between the second location and the third location.

The methodologies described herein in flow charts and message flows may be implemented by various means depending upon the application. For example, these methodologies may be implemented in hardware, firmware, software, or any combination thereof. For a hardware implementation, processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Although the disclosure is illustrated in connection with specific embodiments for instructional purposes, the disclosure is not limited thereto. Various adaptations and modifications may be made without departing from the scope Therefore, the spirit and scope of the appended claims should not be limited to the foregoing description.

What is claimed is:

1. A method on a user equipment (UE), the method comprising: obtaining a first set of wireless signal measurements based on signals transmitted from a first set of base stations at a first time at a first location; obtaining a second set of wireless signal measurements based on signals transmitted from a second set of base stations at a second time subsequent to the first time at a second location distinct from the first location; obtaining a displacement measurement, the displacement measurement comprising a relative displacement between the first location and the second location; and determining a position of the UE at the second location based on the first set of wireless signal measurements obtained at the first location, the second set of wireless signal measurements obtained at the second location, and the displacement measurement, wherein the second set of wireless signal measurements is obtained in response to a position request received by the UE, and wherein a first number of base stations in the first set of base stations is less than a dimensionality specified in the position request and a second number of base stations in the second set of base stations is less than the dimensionality specified in the position request.

2. The method of claim 1, wherein the second set of wireless signal measurements is obtained in response to a position request received by the UE and the method further comprises:
providing, in response to the position request, the position of the UE at the second location.

3. The method of claim 1, wherein: a sum of the first number of base stations and the second number of base stations is greater than the dimensionality specified in the position request.

4. The method of claim 1, wherein the first set of wireless signal measurements is obtained autonomously by the UE.

5. The method of claim 1, wherein the displacement measurement is based on at least one of:
Pedestrian Dead Reckoning (PDR) measurements; or
Vehicular Dead Reckoning (VDR) measurements; or
Inertial Measurement Unit (IMU) measurements; or
Visual Inertial Odometry (VIO) measurements; or
Light Detection And Ranging (LIDAR) measurements; or
Radio Detection And Ranging (RADAR) measurements; or
some combination thereof.

6. The method of claim 1, wherein:
the first set of wireless signal measurements and the second set of wireless measurements comprise one of:
Observed Time Difference of Arrival (OTDOA) measurements; or
Time of Arrival (ToA) measurements.

7. The method of claim 1, wherein:
the first set of wireless signal measurements comprises, for each base station in the first set of base stations, a corresponding first Reference Signal Time Difference (RSTD) measurement relative to a first reference cell base station included in the first set of base stations; and
the second set of wireless signal measurements comprise, for each base station in the second set of base stations, a corresponding second RSTD measurement relative to a second reference cell base station, wherein the second set of base stations comprise at least two non-collocated base stations and include the second reference cell base station.

8. The method of claim 1, wherein determining the position of the UE at the second location comprises:
receiving, as location assistance data, a corresponding location of each base station in the first set of base stations and a corresponding location of each base station in the second set of base stations; and
determining the position of the UE based further on the locations of base stations in the first set of base stations and the locations of base stations in the second set of base stations.

9. The method of claim 1, further comprising:
determining a position of the UE at a third location based on an additional displacement measurement between the second location and the third location.

10. A User Equipment (UE) comprising: a displacement sensor, and a processor coupled to the displacement sensor, wherein the processor is configured to: obtain a first set of wireless signal measurements based on signals transmitted from a first set of base stations at a first time at a first location; obtain a second set of wireless signal measurements based on signals transmitted from a second set of base stations at a second time subsequent to the first time at a second location distinct from the first location, obtain a displacement measurement from the displacement sensor, the displacement measurement comprising a relative displacement between the first location and the second location; and determine a position of the UE at the second location based on the first set of wireless signal measurements obtained at the first location, the second set of wireless signal measurements obtained at the second location, and the displacement measurement, wherein the second set of wireless signal measurements is obtained in response to a position request received by the UE, and wherein a first number of base stations in the first set of base stations is less than a dimensionality specified in the position request and a second number of base stations in the second set of base stations is less than the dimensionality specified in the position request.

11. The UE of claim 10, wherein the second set of wireless signal measurements is obtained in response to a position request received by the UE and the processor is further configured to:

provide, in response to the position request, the position of the UE at the second location.

12. The UE of claim 10, wherein: a sum of the first number of base stations and the second number of base stations is greater than the dimensionality specified in the position request.

13. The UE of claim 10, wherein the first set of wireless signal measurements is obtained autonomously by the UE.

14. The UE of claim 10, wherein the displacement sensor comprises at least one of:
   a Pedestrian Dead Reckoning (PDR) sensor; or
   a Vehicular Dead Reckoning (VDR) sensor; or
   an Inertial Measurement Unit (IMU); or
   a Visual Inertial Odometry (VIO) engine; or
   a Light Detection And Ranging (LIDAR) sensor; or
   a Radio Detection And Ranging (RADAR) sensor; or
   some combination thereof.

15. The UE of claim 10, wherein:
   the first set of wireless signal measurements and the second set of wireless measurements comprise one of:
      Observed Time Difference of Arrival (OTDOA) measurements; or
      Time of Arrival (ToA) measurements.

16. The UE of claim 10, wherein:
   the first set of wireless signal measurements comprises, for each base station in the first set of base stations, a corresponding first Reference Signal Time Difference (RSTD) measurement relative to a first reference cell base station included in the first set of base stations; and
   the second set of wireless signal measurements comprise, for each base station in the second set of base stations, a corresponding second RSTD measurement relative to a second reference cell base station, wherein the second set of base stations comprise at least two non-collocated base stations and include the second reference cell base station.

17. The UE of claim 10, wherein to determine the second location of the UE, the processor is configured to:
   receive, as location assistance data, a corresponding location of each base station in the first set of base stations and a corresponding location of each base station in the second set of base stations; and
   determine the position of the UE based further on the locations of base stations in the first set of base stations and the locations of base stations in the second set of base stations.

18. The UE of claim 10, wherein the processor is further configured to:
   determine a position of the UE at a third location based on an additional displacement measurement between the second location and the third location.

19. A User Equipment (UE) comprising: means for obtaining a first set of wireless signal measurements based on signals transmitted from a first set of base stations at a first time at a first location; means for obtaining a second set of wireless signal measurements based on signals transmitted from a second set of base stations at a second time subsequent to the first time at a second location distinct from the first location; means for obtaining a displacement measurement, the displacement measurement comprising a relative displacement between the first location and the second location; and means for determining a position of the UE at the second location based on the first set of wireless signal measurements obtained at the first location, the second set of wireless signal measurements obtained at the second location, and the displacement measurement, wherein means for obtaining the second set of wireless signal measurements obtains the second set of wireless signal measurements in response to a position request received by the UE, and wherein a first number of base stations in the first set of base stations is less than a dimensionality specified in the position request, and a second number of base stations in the second set of base stations is less than the dimensionality specified in the position request.

20. The UE of claim 19, wherein means for obtaining the second set of wireless signal measurements obtains the second set of wireless signal measurements in response to a position request received by the UE, and the UE further comprises:
   means for providing, in response to the position request, the position of the UE at the second location.

21. The UE of claim 19, wherein: a sum of the first number of base stations and the second number of base stations is greater than the dimensionality specified in the position request.

22. The UE of claim 19, wherein means for obtaining the first set of wireless signal measurements obtains the first set of wireless signal measurements autonomously.

23. The UE of claim 19, wherein:
   the first set of wireless signal measurements and the second set of wireless measurements comprise one of:
      Observed Time Difference of Arrival (OTDOA) measurements; or
      Time of Arrival (ToA) measurements.

24. A non-transitory computer-readable medium comprising executable instructions to configure a processor on a User Equipment (UE) to: obtain a first set of wireless signal measurements based on signals transmitted from a first set of base stations at a first time at a first location; obtain a second set of wireless signal measurements based on signals transmitted from a second set of base stations at a second time subsequent to the first time at a second location distinct from the first location; obtain a displacement measurement, the displacement measurement comprising a relative displacement between the first location and the second location; and determine a position of the UE at the second location based on the first set of wireless signal measurements obtained at the first location, the second set of wireless signal measurements obtained at the second location, and the displacement measurement, wherein the second set of wireless signal measurements is obtained in response to a position request received by the UE, and wherein a first number of base stations in the first set of base stations is less than a dimensionality specified in the position request and a second number of base stations in the second set of base stations is less than the dimensionality specified in the position request.

25. The computer-readable medium of claim 24, wherein: a sum of the first number of base stations and the second number of base stations is greater than the dimensionality specified in the position request one or more second base stations comprise at least two non-collocated second base stations.

26. The computer-readable medium of claim 24, wherein the first set of wireless signal measurements is obtained autonomously by the UE.

* * * * *